United States Patent
Saka et al.

(10) Patent No.: US 7,551,326 B2
(45) Date of Patent: Jun. 23, 2009

(54) IMAGE READING APPARATUS FOR DETECTING NOISE IN IMAGE DATA

(75) Inventors: Masaaki Saka, Toyokawa (JP);
Kazuhiro Ishiguro, Toyohashi (JP);
Takayuki Nabeshima, Toyokawa (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 788 days.

(21) Appl. No.: 11/020,233

(22) Filed: Dec. 27, 2004

(65) Prior Publication Data

US 2006/0066921 A1    Mar. 30, 2006

(30) Foreign Application Priority Data

Sep. 30, 2004    (JP) .............................. 2004-286213

(51) Int. Cl.
*H04N 1/38* (2006.01)

(52) U.S. Cl. .................. 358/463; 358/464; 382/275

(58) Field of Classification Search .............. 382/275; 358/464, 463
See application file for complete search history.

(56) References Cited

U.S. PATENT DOCUMENTS

| | | | |
|---|---|---|---|
| 4,980,760 A | 12/1990 | Hiratsuka et al. | |
| 5,317,420 A | 5/1994 | Kuwahara | |
| 5,850,293 A | 12/1998 | Suzuki et al. | |
| 5,982,946 A | 11/1999 | Murakami | |
| 6,125,213 A | 9/2000 | Morimoto | |
| 6,215,512 B1 | 4/2001 | Imaizumi et al. | |
| 6,323,959 B1 | 11/2001 | Toyama et al. | |
| 6,441,915 B1 | 8/2002 | Imaizumi et al. | |
| 6,625,331 B1 | 9/2003 | Imaizumi et al. | |
| 6,631,207 B2 | 10/2003 | Hirota et al. | |
| 6,728,418 B1 | 4/2004 | Kumagai et al. | |
| 6,778,297 B1 | 8/2004 | Fujiwara | |

(Continued)

FOREIGN PATENT DOCUMENTS

EP    0270090    9/1993

(Continued)

OTHER PUBLICATIONS

U.S. Appl. No. 11/012,184, filed Dec. 16, 2004, Ishiguro et al.

(Continued)

*Primary Examiner*—King Y Poon
*Assistant Examiner*—William C Storey
(74) *Attorney, Agent, or Firm*—Morrison & Foerster LLP

(57) ABSTRACT

An image reading apparatus includes, with the purpose of detecting noise in an image due to dust on a platen, three line sensors, a platen between an original and the line sensors, a moving mechanism for moving the platen, a noise detection processor detecting noise pixels from multiple data output from the line sensors, an order determination unit determining the order in which the noise pixel is detected, based on the order in which the line sensors are arranged and the direction in which the platen is moved, and a noise length calculator predicting the noise length in the sub scanning direction based on the number of noise pixels successive in the main scanning direction, the original transport rate, the platen moving rate, and the distance between the line sensors.

8 Claims, 15 Drawing Sheets

U.S. PATENT DOCUMENTS

| | | | |
|---|---|---|---|
| 6,806,902 | B1 | 10/2004 | Donovan |
| 7,046,861 | B2 | 5/2006 | Imaizumi et al. |
| 7,072,075 | B2 * | 7/2006 | Kondo et al. ................. 358/1.9 |
| 7,079,685 | B1 | 7/2006 | Hirota et al. |
| 7,283,164 | B2 | 10/2007 | Kakarala et al. |
| 7,382,406 | B2 | 6/2008 | Higuchi |
| 2001/0026380 | A1 | 10/2001 | Imoto |
| 2002/0136463 | A1 | 9/2002 | Akahori et al. |
| 2006/0066915 | A1 | 3/2006 | Saka et al. |
| 2006/0066916 | A1 | 3/2006 | Ishiguro et al. |
| 2006/0066917 | A1 | 3/2006 | Ishiguro et al. |
| 2006/0066918 | A1 | 3/2006 | Ishiguro et al. |
| 2006/0066919 | A1 | 3/2006 | Saka et al. |
| 2006/0066920 | A1 | 3/2006 | Saka et al. |
| 2006/0072169 | A1 | 4/2006 | Ishiguro et al. |
| 2006/0072826 | A1 | 4/2006 | Ishiguro et al. |
| 2006/0098248 | A1 | 5/2006 | Suzuki et al. |

FOREIGN PATENT DOCUMENTS

| | | |
|---|---|---|
| JP | 63-141455 | 6/1988 |
| JP | 1-309467 | 12/1989 |
| JP | 05-324812 | 12/1993 |
| JP | 9-139844 | 5/1997 |
| JP | 10-228536 | 8/1998 |
| JP | 11-266373 | 9/1999 |
| JP | 2000-278485 | 10/2000 |
| JP | 2000-287031 A | 10/2000 |
| JP | 2000-324312 | 11/2000 |
| JP | 2001-103249 | 4/2001 |
| JP | 2001-272829 | 10/2001 |
| JP | 2002-77584 | 3/2002 |
| JP | 2002-185767 | 6/2002 |
| JP | 2002-271631 | 9/2002 |
| JP | 2002-354262 | 12/2002 |
| JP | 2003-8846 | 1/2003 |
| JP | 2003-259096 | 9/2003 |
| JP | 2003-315933 | 11/2003 |
| JP | 2004-112611 | 4/2004 |
| JP | 2004-112645 | 4/2004 |

OTHER PUBLICATIONS

U.S. Appl. No. 11/012,231, filed Dec. 16, 2004, Ishiguro et al.
U.S. Appl. No. 11/017,662, filed Dec. 22, 2004, Ishiguro et al.
U.S. Appl. No. 11/019,520, filed Dec. 23, 2004, Ishiguro et al.
U.S. Appl. No. 11/019,181, filed Dec. 23, 2004, Ishiguro et al.
U.S. Appl. No. 11/019,712, filed Dec. 23, 2004, Saka et al.
U.S. Appl. No. 11/020,209, filed Dec. 27, 2004, Saka et al.
U.S. Appl. No. 11/020,232, filed Dec. 27, 2004, Suzuki et al.
U.S. Appl. No. 11/020,479, filed Dec. 27, 2004, Saka et al.
Japanese Office Action mailed on Oct. 28, 2008 directed towards foreign application No. 2004-286214; 4 pages.
Japanese Notice of Grounds of Rejection, mailed on Feb. 10, 2009, directed to Japanese Patent Application No. 2004-326869.

* cited by examiner

F I G. 1
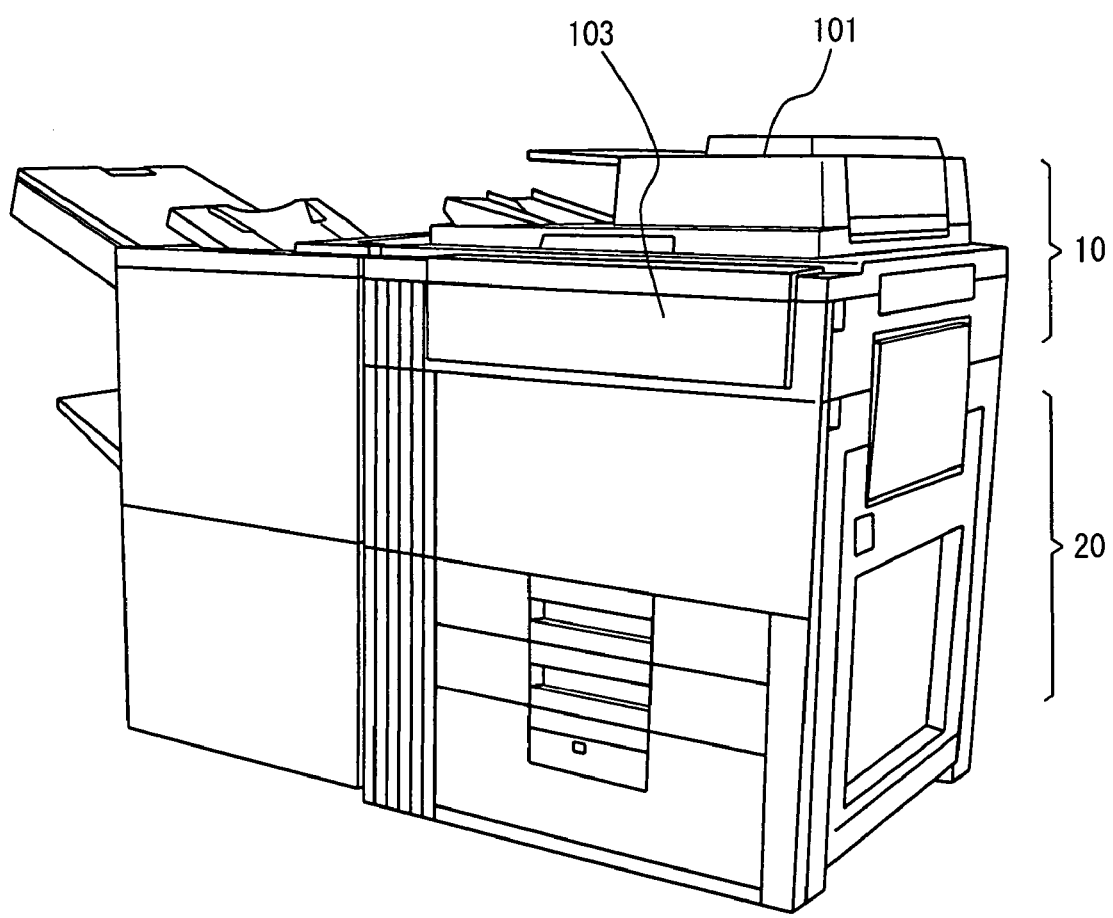

F I G. 3
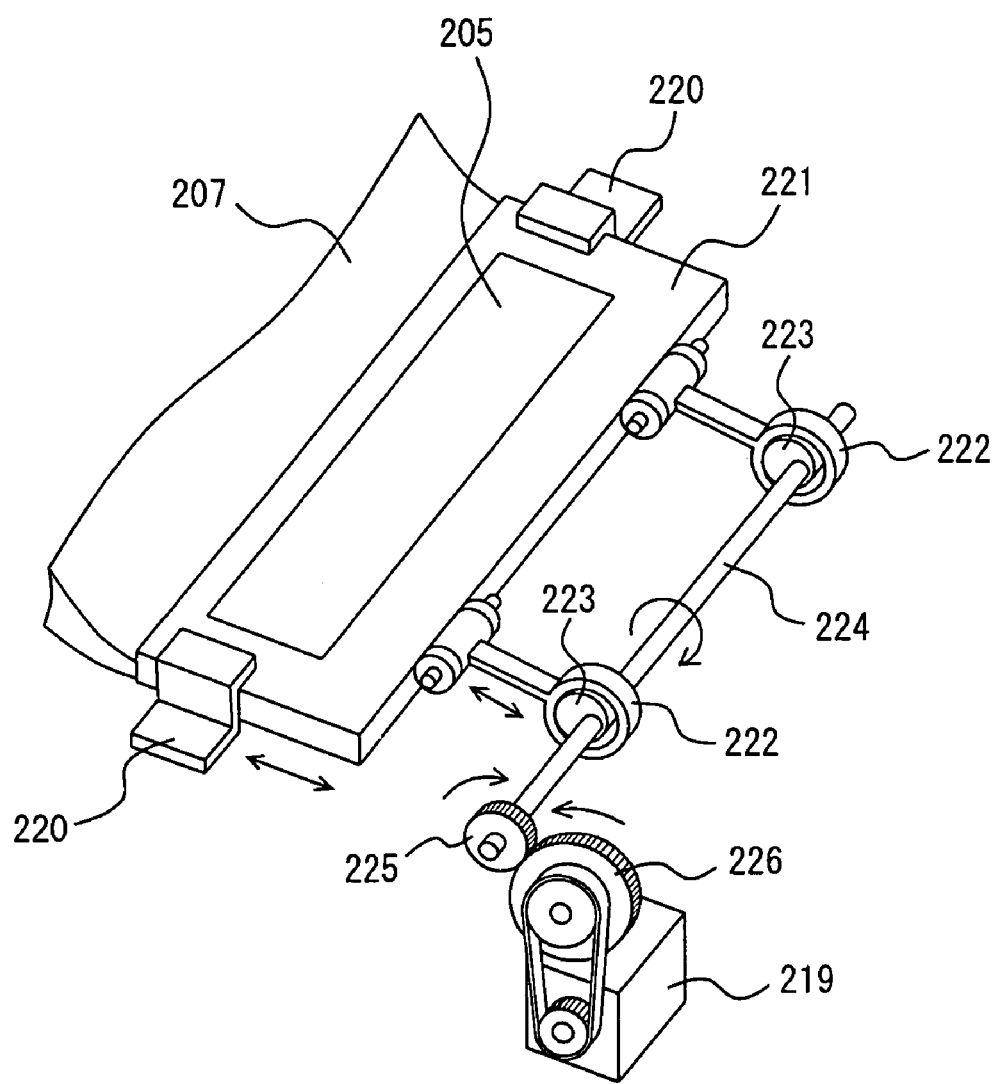

F I G. 6
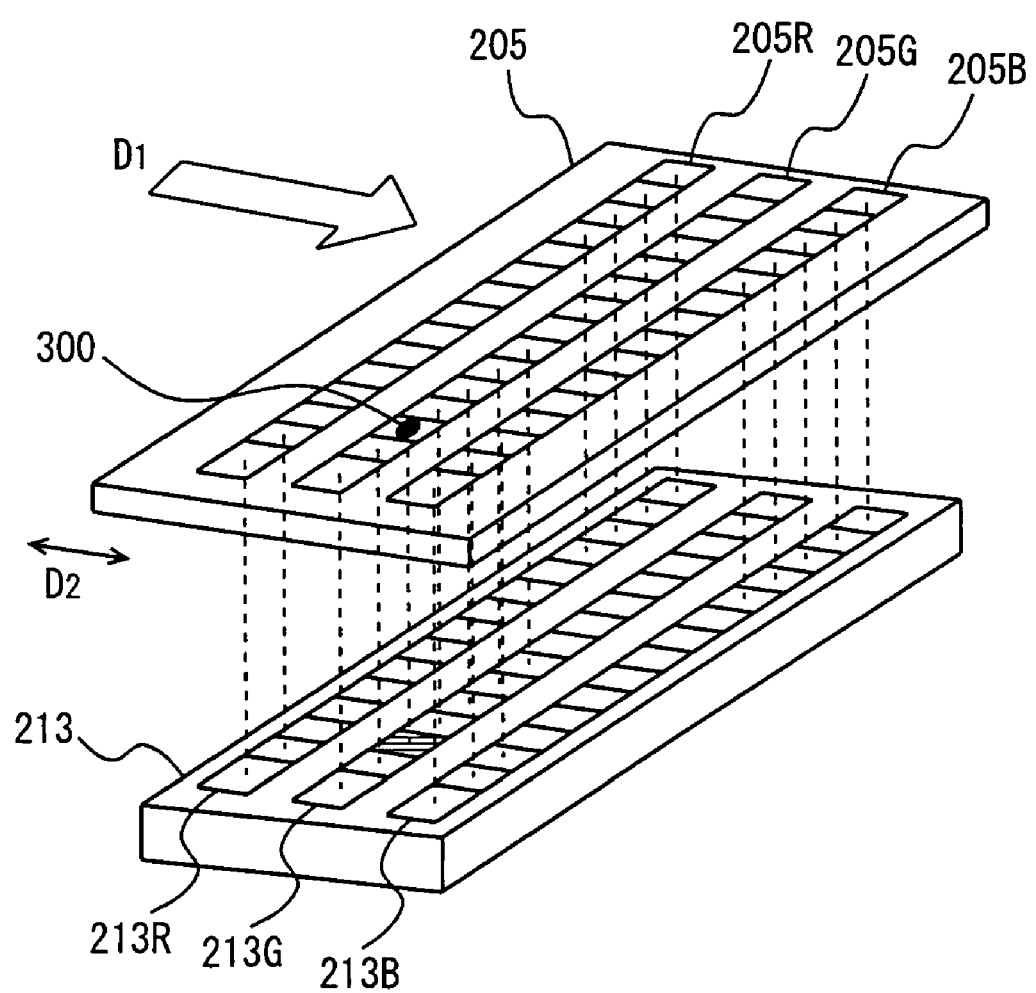

FIG. 10A
FIG. 10B
| C | C | C |
|---|---|---|
| C | A | C |
| C | C | C |
FIG. 10C
FIG. 10D
| C | C | C | C | C |
|---|---|---|---|---|
| C | B | B | B | C |
| C | B | A | B | C |
| C | B | B | B | C |
| C | C | C | C | C |
FIG. 10E
FIG. 10F
| C | C | C | C | C | C | C |
|---|---|---|---|---|---|---|
| C | B | B | B | B | B | C |
| C | B | B | B | B | B | C |
| C | B | B | A | B | B | C |
| C | B | B | B | B | B | C |
| C | B | B | B | B | B | C |
| C | C | C | C | C | C | C |

IMAGE READING APPARATUS FOR DETECTING NOISE IN IMAGE DATA

This application is based on Japanese Patent Application No. 2004-286213 filed with the Japan Patent Office on Sep. 30, 2004, the entire content of which is hereby incorporated by reference.

BACKGROUND OF THE INVENTION

1. Field of the Invention

The present invention relates generally to image reading apparatuses and particularly to image reading apparatuses reading an original while transporting it.

2. Description of the Related Art

Conventionally digital copiers and similar image reading apparatuses employ a technique referred to as so-called "reading an original while passing the original." More specifically, an original is transported relative to a fixed line sensor in a sub scanning direction orthogonal to the line sensor as the original is read.

Such image reading apparatus is provided with a transparent platen between the original and the line sensor to fix a position at which a transported original is read. The original reflects light which is in turn received via the platen by the line sensor.

As such, if dust, paper particles, flaws or other similar foreign matters (hereinafter generally referred to as "dust") adhere on the platen's reading position, the line sensor will read the dust while reading a transported original. This provides an output image with noise in the form of a line in the sub scanning direction.

Japanese Laid-Open Patent Publication No. 2000-278485 describes an image reading apparatus that detects noise caused by dust adhering on a platen glass's reading position from a read image by oscillating the platen in a main scanning direction as the apparatus reads an original. This image reading apparatus detects a specific waveform appearing in an image as noise generated by reading dust.

The image reading apparatus described in Japanese Laid-Open Patent Publication No. 2000-278485, however, employs pattern-matching to detect the specific waveform appearing in an image. As such, if an original includes such a pattern, the apparatus would erroneously detect the pattern.

SUMMARY OF THE INVENTION

The present invention has been made to overcome the above disadvantage and contemplates an image reading apparatus capable of detecting with improved precision noise generated in an image by dust existing on a platen.

To achieve the above object the present invention in one aspect provides an image reading apparatus including: a plurality of line sensors arranged to be mutually spaced in a sub scanning direction to scan an original in the sub scanning direction; a platen arranged between the original and the plurality of line sensors; a mover moving the platen at a rate relative to the plurality of line sensors, the rate being different from that of the original relative to the plurality of line sensors; a noise pixel detector detecting a noise pixel from each of a plurality of data output from the plurality of line sensors; a determination unit determining the order in which the noise pixel is detected from the data output from the plurality of line sensors, based on the order in which the plurality of line sensors are arranged and the direction in which the platen is moved; a noise length predictor predicting the length of noise in the sub scanning direction, in response to detection of the noise pixel by the noise pixel detector from the data output from one of the plurality of line sensors that precedes in the order determined by the determination unit, the length being predicted based on the number of detected noise pixels successive in a main scanning direction, the rate of the original relative to the plurality of line sensors, the rate of the platen relative to the plurality of line sensors, and the distance between the plurality of arranged line sensors; and a determiner determining as effective the noise pixel detected from the data output from one of the line sensors that follows the line sensor preceding in the order determined by the determination unit, in the period from the time at which the noise pixel is detected from the data output from the line sensor preceding in the order to the time at which the predicted length of noise is reached.

In accordance with the present invention the original is scanned in the sub scanning direction by a plurality of line sensors spaced in the sub scanning direction and between the original and the line sensors there is provided the platen moving at a rate relative to the line sensors, the rate being different from that of the original relative to the line sensors. When the platen has dust adhering thereon, the dust is read by the line sensors sequentially. As the platen is moved at a rate relative to the line sensors, the rate being different from that of the original relative to the line sensors, the dust on the platen is read by each line sensor at a different location in the original. The image reading apparatus detects a noise pixel from each of a plurality of data output respectively from the line sensors, determines the order in which the noise pixel is detected from the data output from the line sensors, based on the order in which the line sensors are arranged and the direction in which the platen is moved, and predicts the length of noise in the sub scanning direction, in response to detection of the noise pixel from the data output from a line sensor that precedes in the determined order, the prediction being made based on the number of noise pixels successive in the main scanning direction, the rate of the original relative to the line sensors, the rate of the platen relative to the line sensors, and the distance between the arranged line sensors. In the period from the time the noise pixel is detected from the data output from the line sensor preceding in the determined order to the time the predicted noise length is reached, the noise pixel is determined as effective that is detected from the data output from a line sensor following the preceding line sensor in the determined order. Since the length of noise in the sub scanning direction can be determined from the number of noise pixels successive in the main scanning direction, data in which noise pixels are expected to be present can be predicted. Further, when both of the condition that a pixel is detected as a noise pixel and the condition that the detected noise pixel is present at a predicted location are satisfied, the noise pixel is determined as effective, so that the precision of detection of the noise pixel can be improved. Furthermore, since noise pixels detected after the predicted noise length is reached are determined as invalid, it can be avoided to erroneously determine a normal image as noise pixels. The image reading apparatus can thus be provided with improved precision in detecting noise from an image read from the original that is generated due to dust on the platen.

The present invention in another aspect provides an image reading apparatus including: a plurality of line sensors arranged to be mutually spaced in a sub scanning direction to scan an original in the sub scanning direction; a platen arranged between the original and the plurality of line sensors; a mover moving the platen at a rate relative to the plurality of line sensors, the rate being different from that of the original relative to the plurality of line sensors; a noise pixel detector detecting a noise pixel from each of a plurality of data output from the plurality of line sensors; a determination unit determining the order in which the noise pixel is detected from the data output from the plurality of line sensors, based on the order in which the plurality of line sensors are arranged and the direction in which the platen is moved; a noise position predictor predicting the position where the noise pixel is detected from the data output from one of the plurality of line sensors that is last in the order determined by the determination unit, in response to detection of the noise pixel by the noise pixel detector from the data output from one of the plurality of line sensors that precedes in the order determined by the determination unit, the position being predicted based on the position of the noise pixel detected from the data output from the line sensor preceding in the order, the rate of the original relative to the plurality of line sensors, the rate of the platen relative to the plurality of line sensors, and the distance between the plurality of arranged line sensors; and a determiner determining as effective the noise pixel detected from the data output from one of the line sensors that follows the line sensor preceding in the order determined by the determination unit, in the period from the time at which the noise pixel is detected from the data output from the line sensor preceding in the order to the time at which the data of the predicted position is output from the line sensor that is last in the order.

In accordance with the present invention a noise pixel is detected from each of a plurality of data that are output from respective line sensors. The order in which the noise pixel is detected from the data output from the line sensors is determined based on the order in which the line sensors are arranged and the direction in which the platen is moved. In response to detection of a noise pixel from data that is output from a line sensor preceding in the determined order, the position where a noise pixel is detected by a line sensor that is last in the determined order is predicted based on the position of the noise pixel, the rate of the original relative to the line sensors, the rate of the platen relative to the line sensors, and the distance between the arranged line sensors. In the period from the time the noise pixel is detected from the data output from the line sensor preceding in the determined order to the time data of the predicted position is output from the line sensor that is last in the determined order, a noise pixel detected from data output from a line sensor that follows the preceding line sensor in the determined order is determined as effective. The image reading apparatus can thus be provided with improved precision in detecting noise from an image read from the original that is generated due to dust on the platen.

The present invention in a further aspect provides an image reading apparatus including: a plurality of line sensors arranged to be mutually spaced in a sub scanning direction to scan an original in the sub scanning direction; a platen arranged between the original and the plurality of line sensors; a mover moving the platen at a rate relative to the plurality of line sensors, the rate being different from that of the original relative to the plurality of line sensors; a noise pixel detector detecting a noise pixel from each of a plurality of data output from the plurality of line sensors; a determination unit determining the order in which the noise pixel is detected from the data output from the plurality of line sensors, based on the order in which the plurality of line sensors are arranged and the direction in which the platen is moved; and a noise length predictor predicting the length of noise in the sub scanning direction, in response to detection of the noise pixel by the noise pixel detector from the data output from one of the plurality of line sensors that precedes in the order determined by the determination unit, the length being predicted based on the number of detected noise pixels successive in a main scanning direction, the rate of the original relative to the plurality of line sensors, the rate of the platen relative to the plurality of line sensors, and the distance between the plurality of arranged line sensors.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a perspective view of an MFP including an image reading apparatus in one embodiment of the present invention.

FIG. 3 is a perspective view of a mechanism employed to oscillate a platen.

FIG. 6 shows a position on a platen read by a reader.

FIGS. 10A-10F show an edge extraction filter by way of example.

DESCRIPTION OF THE PREFERRED EMBODIMENTS

Figure 2:
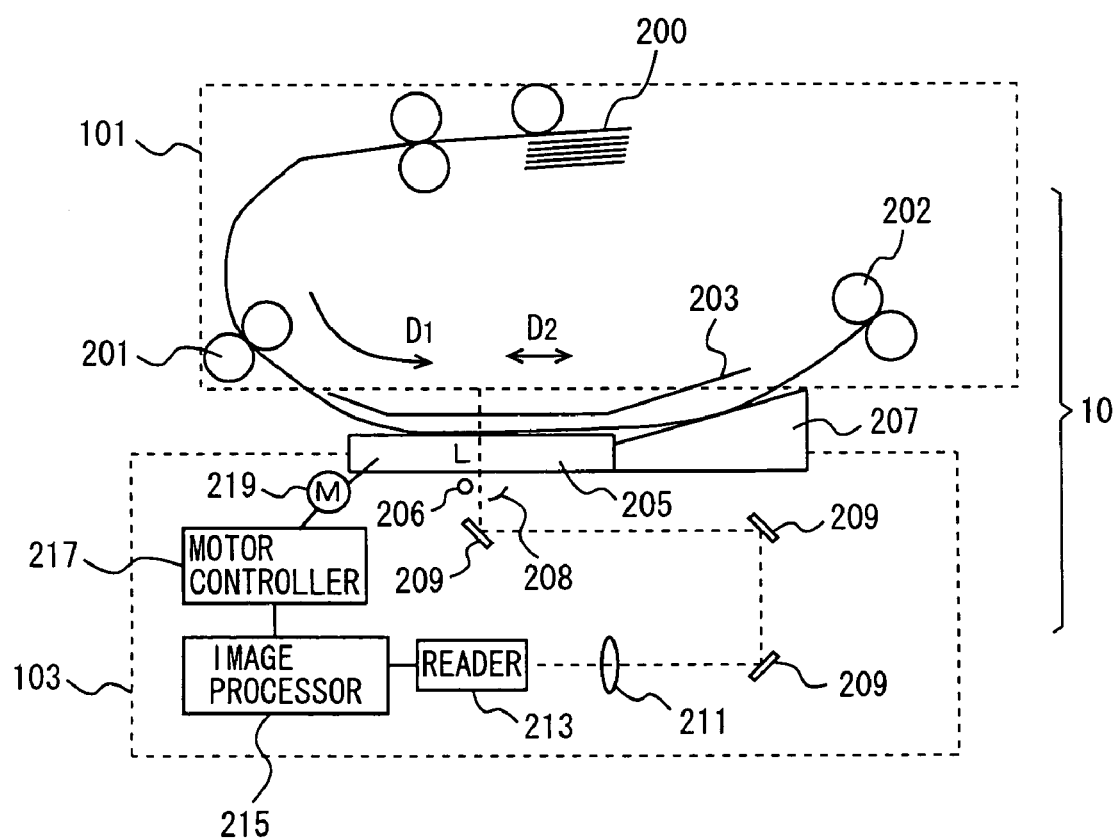
FIG. 2 schematically shows the image reading apparatus's internal structure.

Hereinafter reference will be made to the drawings to describe embodiments of the present invention. In the following description, like components are denoted by like reference characters and also identical in name and function.

FIG. 1 is a perspective view of a multi-function peripheral (MFP) including an image reading apparatus in one embodiment of the present invention. With reference to the figure, the MFP includes an image reading apparatus 10 operative to read an original image, and an image forming apparatus 20 provided under image reading apparatus 10. The MFP forms an image read by image reading apparatus 10 on a sheet of paper or similar recording medium. Furthermore, the MFP includes a communications interface to connect with a facsimile device, a local area network (LAN), a public line or similar network.

FIG. 2 schematically shows an internal configuration of image reading apparatus 10. Image reading apparatus 10 includes an automatic document feeder (ADF) 101 and a main body 103. ADF 101 includes an upper restraint plate 203 guiding a transported original in the vicinity of an original reading position, a timing roller pair 201 transporting the original to the original reading position, and a roller pair 202 transporting the original having moved past the reading position.

Main body 103 includes a platen 205 formed of a transparent member, a sheet passage guide 207 forming a portion of a path of the original, a source of light 206 illuminating the original at the reading position, a reflector member 208 reflecting the light emitted from the source of light, a reader 213 having three line sensors arranged in a sub scanning direction, a reflector mirror 209 arranged to reflect light reflected from the original and guide the reflection of light to reader 213, a lens 211 focusing the reflection of light on reader 213, an image processor 215 processing an electrical signal output from reader 213, a motor 219 operative to oscillate platen 205, and a motor controller 217 operative in response to a control signal received from image processor 215 to control the driving of motor 219.

An original 200 is transported by timing roller pair 201 between platen 205 and upper restraint plate 203 in a direction D1. The original being transported has its image read at a reading position L by reader 213 successively. ADF 101 transports an original in the sub scanning direction, as seen at a reading position L. During the image reading operation, platen 205 is oscillated by motor 219 in a direction D2. Platen 205 oscillates in a direction substantially parallel to the sub scanning direction.

Reader 213 includes three line sensors each having a plurality of photoelectric conversion elements arranged in a main scanning direction substantially perpendicular to the sub scanning direction. The three line sensors have filters, respectively, different in spectral sensitivity and receive light reflected from an original through the filters. More specifically, the sensors have filters transmitting light of waveforms of red (R), green (G) and blue (B). Thus, the line sensor having the filter of red (R) outputs an R signal, an electrical signal indicating an intensity of red light of light reflected from an original, the line sensor having the filter of green (G) outputs a G signal, an electrical signal indicating an intensity of green light of light reflected from the original, and the line sensor having the filter of blue (B) outputs a B signal, an electrical signal indicating an intensity of blue light of light reflected from the original.

The three line sensors are arranged in the sub scanning direction in a predetermined order with a predetermined distance therebetween. In this example, the line sensors are spaced by a distance corresponding to three original reading lines, and arranged, red first, followed by green and then blue as seen in the direction in which an original is transported, although the line sensors may be spaced by different distances and arranged in different orders.

The three line sensors thus spaced and arranged simultaneously receive at the same timing the light reflected by an original at different locations. As such, the light reflected by the original at a location is initially received by the red light receiving line sensor, subsequently by the green light receiving line sensor, and finally by the blue light receiving line sensor. This delay is adjusted by image processor 215, as will be described later.

Note that while in the present embodiment reader 213 is provided with three line sensors, it may be provided with four or more line sensors.

FIG. 3 is a perspective view showing a mechanism employed to oscillate the platen. With reference to the figure, platen 205 is held by a platen holder 221 held slidably in the sub scanning direction by a guide 220 fixed to the main body of image reading apparatus 10. Platen holder 221 has one surface with two arms 222 connected thereto. Arm 222 has the other end provided with a circular hole.

A shaft 224 at portions corresponding to the two arms 222 has two cams 223 attached thereto. Furthermore, shaft 224 has one end with a gear 225 attached thereto. Gear 225 is arranged to mesh with a gear 226 linked by a belt to the motor 219 drive shaft. As motor 219 runs, the motor's rotation is transmitted by the belt to gear 226, and gear 226 thus rotates. As gear 226 rotates, gear 225 and shaft 224 rotate.

Cam 223 is arranged in the circular hole of arm 222. As such, as shaft 224 rotates, the two cams 223 accordingly provide rotation, which is converted to translation movement of platen holder 221.

Note that platen 205 may be oscillated by a mechanism other than that described above. For example, the platen may be oscillated by a mechanism employing a driving source, such as a piston utilizing an electromagnet, air pressure, hydraulic pressure and the like, causing linear movement.

Platen 205 is oscillated parallel to the sub scanning direction. When platen 205 is moving in a direction opposite that in which an original is transported, platen 205 and the original move in the opposite directions. As such, the speed of platen 205 relative to line sensors 213R, 213G, 213B and that of the original relative to the line sensors are different. In contrast, when platen 205 is moving in the direction in which the original is transported, the speed of platen 205 and that of the original transported are the same in direction. Preferably, they should be different in rate. Note that while herein platen 205 is oscillated parallel to the sub scanning direction, the platen may be oscillated in different directions.

Figure 4A:
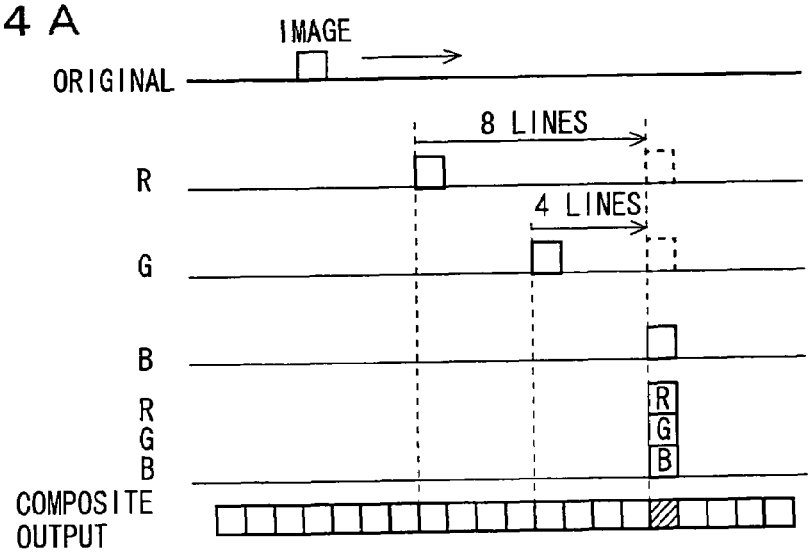
FIGS. 4A-4C are diagrams for illustrating a theory of detecting noise generated by reading dust from a read image.
Figure 4B:
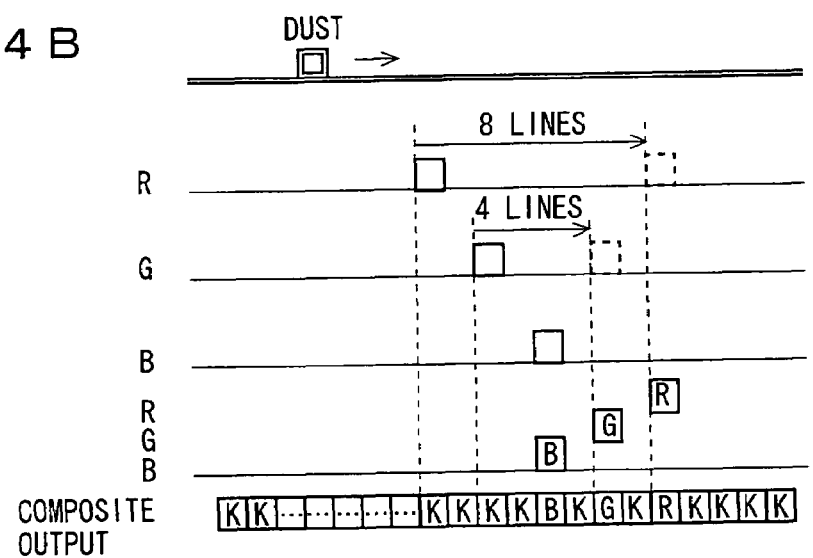
Figure 4C:
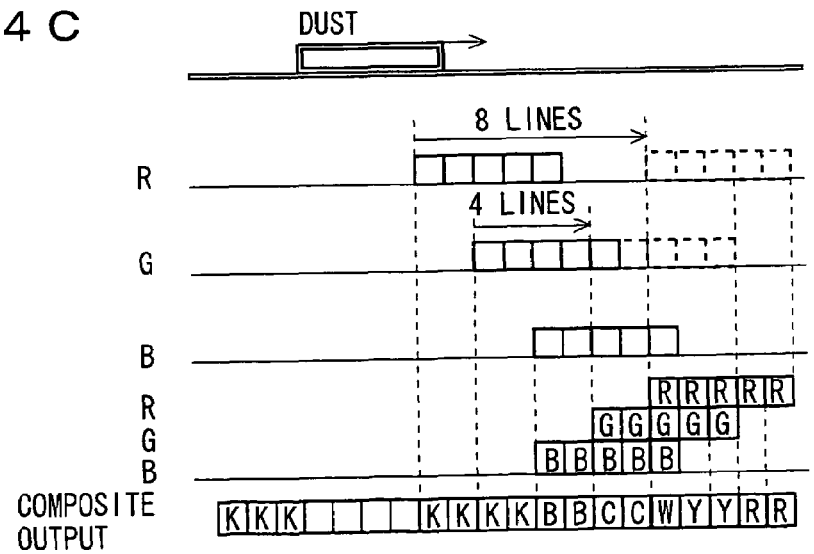

In the present embodiment image reading apparatus 10 detects noise generated by dust adhering on platen 205 from a read image in accordance with a theory as described hereinafter. FIGS. 4A-4C are diagrams for illustrating the theory. For the sake of illustration, an original and platen 205 are transported in the figures in a direction indicated by an arrow, and platen 205 moves at a rate which is the same in direction as and twice in magnitude that at which the original is transported. Furthermore for the sake of illustration the three line sensors are red light, green light and blue light receiving line sensors arranged red first, followed by green and then blue in the direction in which the original is transported, with a distance corresponding to three lines therebetween. R, G and B indicate outputs of the red light, green light and blue light receiving line sensors, respectively.

FIG. 4A is a diagram for illustrating interline correction. The image of a portion of the original is initially read by the red light receiving line sensor arranged most upstream in the direction in which the original is transported. The image is then transported by a distance corresponding to four lines, and read by the green light receiving line sensor. The image is further transported by a distance corresponding to four lines, and read by the blue light receiving sensor.

Thus an image located in an original at a single location is read by three line sensors at different times. As such, the three line sensors output signals offset in timing. Interline correction synchronizes the signals output from the three line sensors so that the signals all correspond to a single location in the original. More specifically, output R is delayed by eight lines and output G is delayed by four lines.

Interline corrected outputs R, G and B are composited to provide a composite output, which corresponds to outputs R, G and B read at a single location in an original and composited together.

FIG. 4B is a diagram for illustrating a composite output provided when dust adhering on a platen is read. The dust adhering on platen 205 is initially read by the red light receiving line sensor arranged most upstream in the direction in which an original is transported. The dust is transported by a distance corresponding to four lines, and read by the green light receiving line sensor. Since platen 205 moves in the same direction as the original at a rate twice that at which the original is transported, the dust moves by four lines in a period of time required for a line sensor to read the original by two lines. As such, between the time point at which the red line sensor reads the dust and that at which the green line sensor reads the dust there is introduced an offset by a period of time corresponding to reading two lines. Furthermore, the dust is transported by a distance corresponding to four lines, and read by the blue light receiving line sensor. Since platen 205 moves in the same direction as the original at a rate twice that at which the original is transported, between the time point at which the green line sensor reads the dust and that at which the blue line sensor reads the dust there is introduced an offset by a period of time corresponding to reading two lines.

By interline correction the red light receiving line sensor reading the dust outputs R delayed by eight lines and the green light receiving line sensor reading the dust outputs G delayed by four lines. As such, interline corrected outputs R, G and B composited together provide a composite output in which outputs R, G and B with the dust read are not composited at the same timing, offset by two lines.

Note that the figure shows a composite output provided when paper particles or similar white dust adhere on platen 205 and a black original is read. Despite that the white dust is read, the composite output is not white but rather an output of blue, green and red divided in three lines.

FIG. 4C is another diagram for illustrating a composite output provided when dust adhering on a platen is read. The figure shows an example of reading dust having a size corresponding to ten lines in the sub scanning direction. Platen 205 moves in the same direction as an original at a rate twice that at which the original is transported. As such, the dust is read as having a size corresponding to five lines.

The dust adhering on platen 205 is initially read by the red light receiving line sensor arranged most upstream in the direction in which the original is transported. The dust is then transported by a distance corresponding to four lines, and read by the green light receiving line sensor. Between the time point at which the red line sensor reads the dust and that at which the green line sensor reads the dust there is introduced an offset by a period of time corresponding to reading two lines. The dust further is transported by a distance corresponding to four lines, and read by the blue light receiving line sensor. Between the time point at which the green line sensor reads the dust and that at which the blue line sensor reads the dust there is introduced an offset by a period of time corresponding to reading two lines.

By interline correction the red light receiving line sensor reading the dust outputs R delayed by eight lines and the green light receiving line sensor reading the dust outputs G delayed by four lines. As such, interline corrected outputs R, G and B composited together provide a composite output in which outputs R, G and B by five lines with the dust read are not composited at the same timing, offset by two lines. Note that the figure shows a composite output provided when paper particles or similar white dust adhere on platen 205 and a black original is read. Despite that the white dust is read, the composite output is an output varying in color, first in blue, followed by cyan, white yellow and then red.

The dust adhering on platen 205 is thus divided in an image into a plurality of lines, which are extracted for each color as a feature point to detect noise. Furthermore, such division also reduces noise caused by reading the dust.

Figure 5:
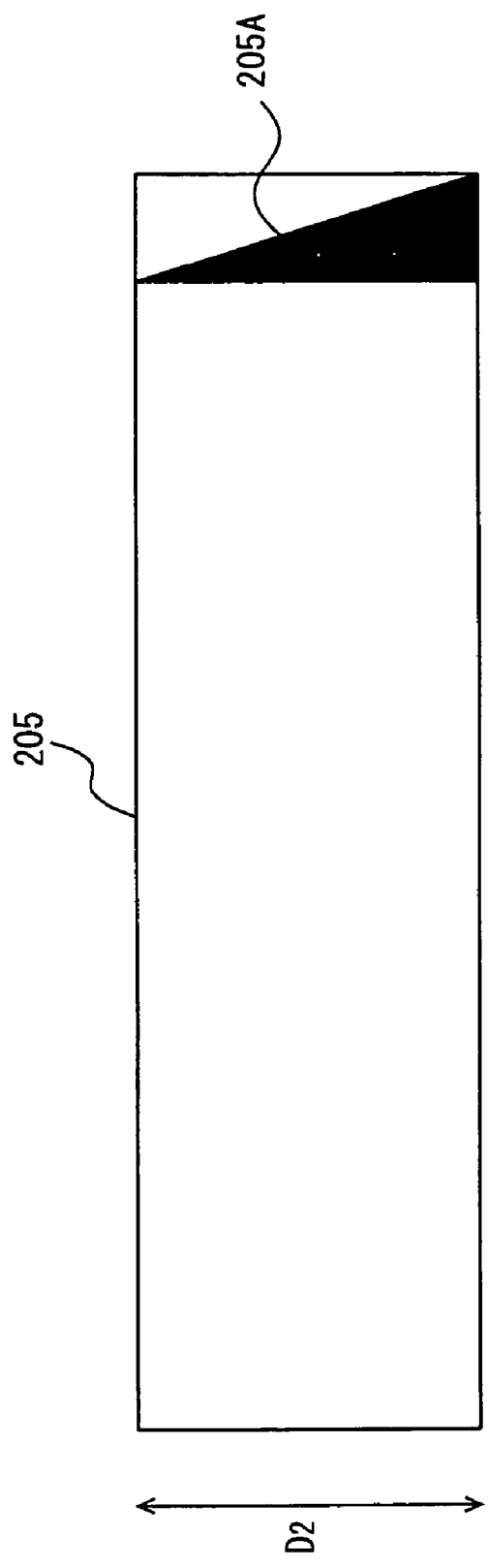
FIG. 5 is a rear plan view of the platen.

FIG. 5 is a plan, rear view of the platen. With reference to the figure, platen 205 has one end with a mark 205A having a single color and a geometry having in the main scanning direction a length varying depending on the position in the sub scanning direction. In this description, mark 205A is a black triangle. Furthermore, mark 205A has one side arranged parallel to one side of platen 205.

Reader 213 or a sensor provided separate from reader 213 and fixed to main body 103 can be used to detect the length of mark 205A in the main scanning direction to detect the position of platen 205 relative to reader 213.

FIG. 6 shows a location on platen 205 read by reader 213. Reader 213 has line sensors 213R, 213G and 213B having filters of red (R), green (G) and blue (B), respectively, arranged in a direction in which an original is transported D1, red first, followed by green and then blue.

Line sensors 213R, 213G and 213B receive light transmitted through platen 205 at regions 205R, 205G and 205B, respectively. Regions 205R, 205G and 205B are arranged to be spaced by three lines. The original initially moves past region 205R, then region 205G and finally region 205B. As such, light reflected by the original at a location is initially received by the red light receiving line sensor 213R, then the green light receiving line sensor 213G, and finally the blue light receiving line sensor 213B. Line sensors 213R, 213G, 213B spaced by three lines thus will not simultaneously receive light reflected by the original at a single location.

If platen 205 has adhering thereto dust 300 having a maximal length of at most four lines, then dust 300 will not exist at two or more of regions 205R, 205G, 205B concurrently as platen 205 moves oscillating parallel to the sub scanning direction. FIG. 6 shows a case where dust 300 exists at region 205G. In this case, light reflected by dust 300 is received only by line sensor 213G and not received by line sensor 213R or 213B.

Furthermore, as platen 205 oscillates, dust 300 will exists at different regions. More specifically, when platen 205 moves in direction D1, dust 300 initially exists at region 205R, then region 205G and finally region 205B. In contrast, when platen 205 moves in a direction opposite direction D1, dust 300 exists initially at region 205B, then region 205G, and finally region 205R.

As such, light reflected by dust 300 is received in such an order that when platen 205 moves in direction D1 the light is received initially by line sensor 213R, then line sensor 213G and finally line sensor 213B and when platen 205 moves opposite to direction D1 the light is received initially by line sensor 213B, then line sensor 213G, and finally line sensor 213R.

When platen 205 is moving in the direction in which the original is transported, noise resulting from reading the dust appears first in the R signal output from line sensor 213R, then in the G signal output from line sensor 213G and finally in the B signal output from line sensor 213B. When platen 205 is moving in the direction opposite to the direction in which the original is transported, noise resulting from reading the dust appears first in the B signal output from line sensor 213B, then in the G signal output from line sensor 213G and finally in the R signal output from line sensor 213R. In other words, in what order the noise appears in the signals is determined by the direction in which platen 205 is moved. The order in which noise is detected from the R, G and B signals can be determined to improve precision in detecting the noise.

Figure 7:
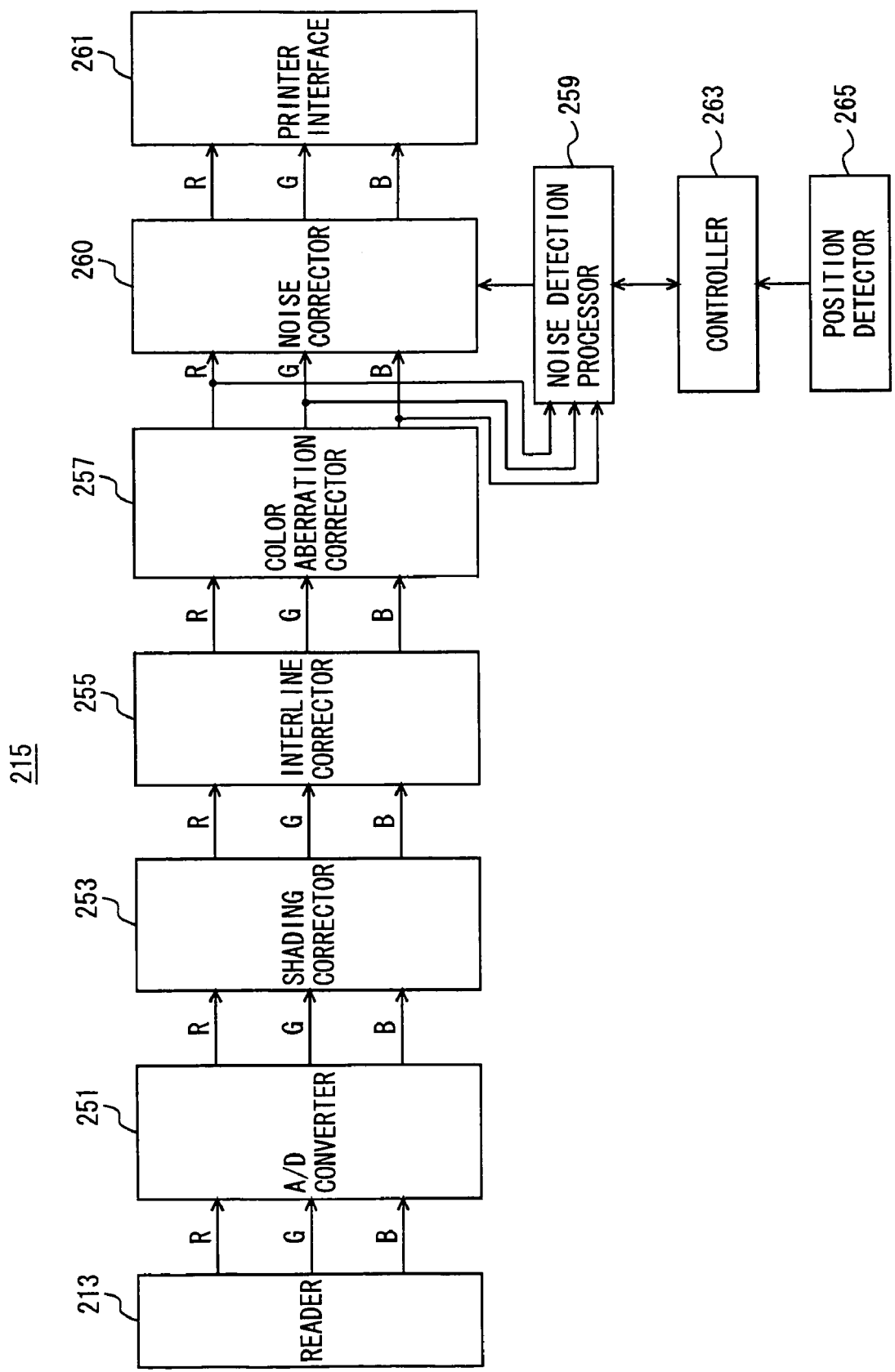
FIG. 7 is a block diagram showing a configuration of an image processor of the image reading apparatus in the present embodiment.

FIG. 7 is a block diagram showing a configuration of the image processor of the image reading apparatus in the present embodiment. With reference to the figure, image processor 215 receives R, G and B signals from reader 213. Image processor 215 includes an analog/digital (A/D) converter 251 receiving an analog signal from reader 213 to convert the analog signal to a digital signal, a shading corrector 253 correcting uneven illumination provided by the source of light 206 or the like, an interline corrector 255 synchronizing the R, G and B signals to be a single line of an original, a color aberration corrector 257 correcting distortion in the main scanning direction introduced by lens 211, a noise detection processor 259 detecting noise from each of the R, G and B signals, a noise corrector 260 effecting a process to correct a noise pixel, a controller 263 generally controlling image processor 215, and a printer interface 261 used to output an image to image forming apparatus 20. Controller 263 has a position detector 265 connected thereto to detect the position of platen 205. Position detector 265 detects a length of mark 205A of platen 205 in the main scanning direction.

Interline corrector 255 delays the R and G signals by eight and four lines, respectively, to synchronize the R, G and B signals to be a single line of the original, since as has been described previously, line sensors 213R, 213G, 213B are spaced in the sub scanning direction by a distance corresponding to three lines.

Noise detection processor 259 receives the R, G and B signals from color aberration corrector 257 and from controller 263 the position of platen 205 and a direction in which platen 205 moves. Noise detection processor 259 detects a noise pixel for each of the R, G and B signals received from color aberration corrector 257, and outputs to noise corrector 260 and controller 263 logical signals of "1" and "0" indicating a noise pixel and a pixel other than a noise pixel, respectively. The detail will be described later.

Noise corrector 260 receives the R, G and B signals from color aberration corrector 257 and from noise detection processor 259 receives for each of the R, G and B signals logical signal of "1" and "0" indicating a noise pixel and a pixel other than a noise pixel, respectively.

Noise corrector 260 operates for each of the R, G and B signals in response to a logical signal corresponding thereto to replace a value of a pixel determined as a noise pixel with that of a neighboring, non-noise pixel. This can simply be done by replacing the value of the pixel determined as the noise pixel with an average, maximum or minimum value of a plurality of neighboring non-noise pixels. Noise corrector 260 outputs to the printer interface the R, G and B signals with any noise pixels replaced with a neighboring pixel(s).

Controller 263 receives the position of platen 205 from position detector 265 and from noise detection processor 259 logical signals of "1" and "0" indicating a noise pixel and a pixel other than noise pixel, respectively. Controller 263 determines from these signals the dust's location on platen 205. More specifically, it determines the position of platen 205 in the sub scanning direction from the position of platen 205 and a logical signal's line number, and the position of platen 205 in the main scanning direction from a location of a noise pixel of the logical signal.

The noise detection process will more specifically be described hereinafter. As has been described with reference to FIG. 6, line sensors 213R, 213G and 213B will read different locations on an original at the same timing. Interline corrector 255 synchronizes the R, G and B signals' lines to obtain R, G and B signals having read a single location on the original.

As such, if platen 205 has dust adhering thereon, R, G and B signals having read a single location on an original have one of them affected.

Figure 8:
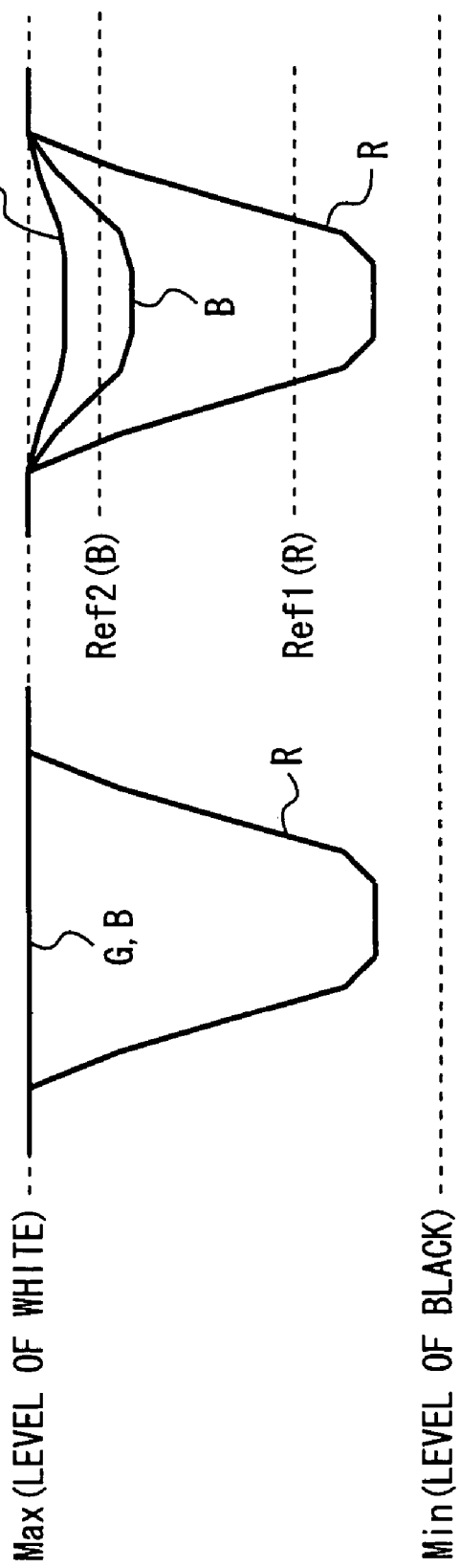
FIGS. 8A and 8B represent one example of RGB signal output from the reader.

FIGS. 8A and 8B represent an example of RGB signal output from the reader. FIG. 8A shows an example of reading a white area of an original with black dust adhering on the platen's region 205R corresponding to line sensor 213R. Line sensor 213R reads a portion of the original with the black dust on region 205R. Subsequently, the portion of the original moves to regions 205G, 205B corresponding to line sensors 213G, 213B, when the dust does not exist on regions 205G, 205B, since the original and platen 205 moves at different rates. As such line sensors 213G, 213B will read the original's white area. Consequently, only an R signal output from line sensor 213R is reduced in lightness and line sensors 213G, 213B output G and B signals high in lightness. Note that herein, "lightness" indicates a value output from the three line sensors 213R, 213G, 213B corresponding to a reflection of light.

The FIG. 8A RGB signals' combination is seldom output when an original is read without dust adhering thereto. A combination closest thereto is a case where an area of cyan, a color complementary to red, is read. FIG. 8B represents RGB signal output from reader 213 when an original's cyan area is read. The R signal significantly drops in lightness, and the G and B signals also drops in lightness. As such, the variation in lightness of the R signal significantly dropping in lightness can be detected by using a threshold value Red (R).

The FIG. 8A RGB signal and the FIG. 8B RGB signal are significantly different in whether the B and G signals are affected. By detecting this difference, black dust can be detected as noise without detecting a cyan line erroneously as noise. As such, the B signal's variation in lightness is detected by using a threshold value Ref2(B). Threshold value Ref2(B) can simply be provided by the smallest one of the following values. Hereinafter, threshold values Ref2(R), Ref2(G), Ref2(B) are indicated.

(1) Detecting Dust of Achromatic Color High in Lightness

To prevent a cyan line from being detected erroneously as noise, the difference between a maximum value in lightness (255) and one of the values in lightness output from the line sensors other than line sensor 213R, i.e., line sensors 213G and 213B, reading a color complementary to red, or cyan, can be set as Ref2(G), Ref2(B). To prevent a magenta line from being detected erroneously as noise, the difference between the maximum value in lightness (255) and one of the values in lightness output from the line sensors other than line sensor 213G, i.e., line sensors 213R and 213B, reading a color complementary to green, or magenta, can be set as Ref2(R), Ref2(B). To prevent a yellow line from being detected erroneously as noise, the difference between the maximum value in lightness (255) and one of the values in lightness output from the line sensors other than line sensor 213B, i.e., line sensors 213R and 213G, reading a color complementary to blue, or yellow, can be set as Ref2(R), Ref2(G).

(2) Detecting Dust of Achromatic Color Low in Lightness

To prevent a red line from being detected erroneously as noise, the difference between a minimum value in lightness (0) and one of the values in lightness output from the line sensors other than line sensor 213R, i.e., line sensors 213G and 213B, reading red color, can be set as Ref2(G), Ref2(B). To prevent a green line from being detected erroneously as noise, the difference between the minimum value in lightness (0) and one of the values in lightness output from the line sensors other than line sensor 213G, i.e., line sensors 213R and 213B, reading green color, can be set as Ref2(R), Ref2(B). To prevent a blue line from being detected erroneously as noise, the difference between the minimum value in lightness (0) and one of the values in lightness output from the line sensors other than line sensor 213B, i.e., line sensors 213R and 213G, reading blue color, can be set as Ref2(R), Ref2(G).

Thus more than one threshold value Ref2(R), Ref2(G), Ref2(B) are obtained, and a minimum value thereof can simply be used.

While herein black dust is detected as noise, dust of achromatic color other than black can also be detected, since any achromatic dust affects all of R, G and B signals.

Furthermore, while herein a white original is read by way of example, an original of any color other than white may be read.

Figure 9:
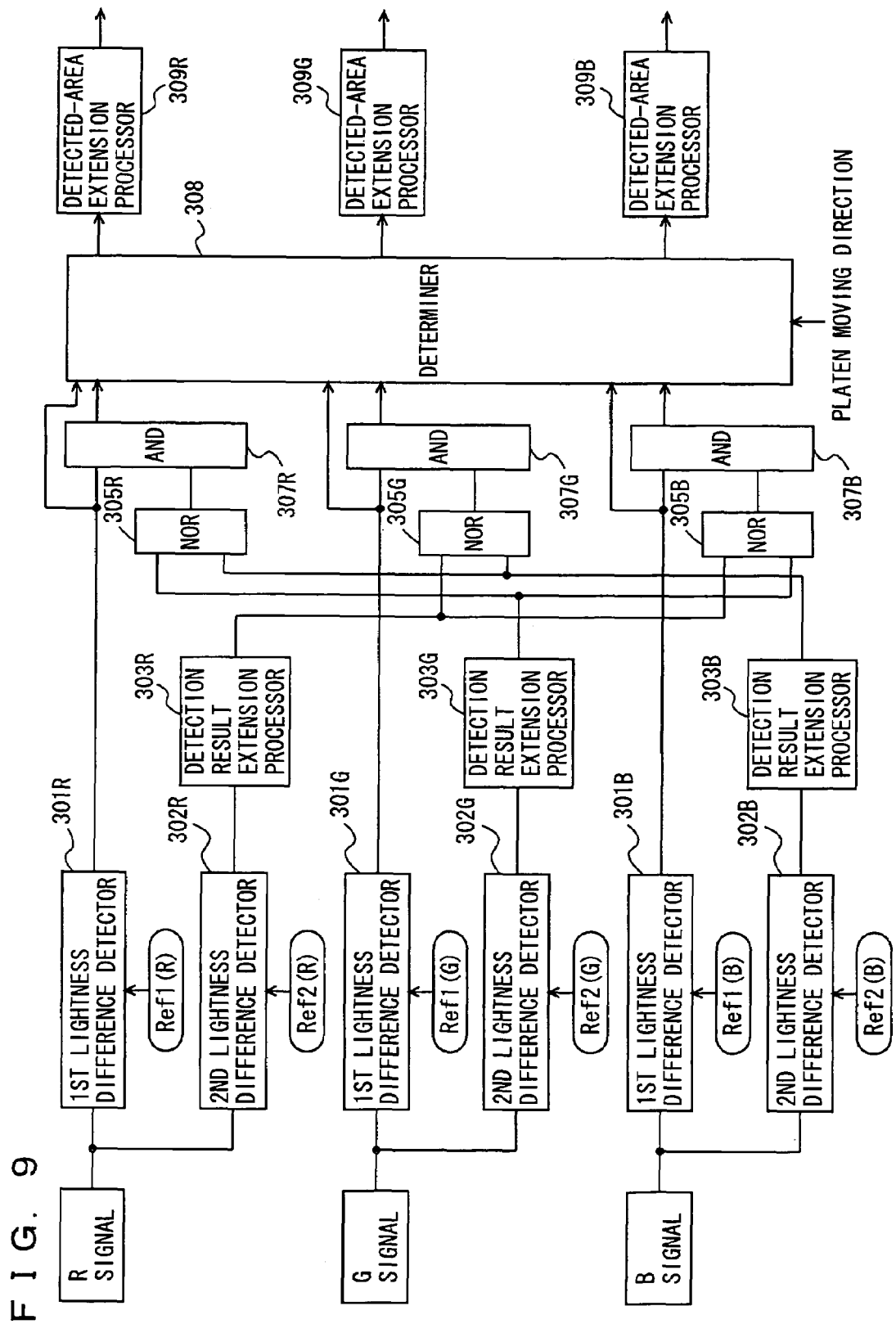
FIG. 9 is a block diagram showing a configuration of a noise detection processor of the image reading apparatus in the present embodiment.

FIG. 9 is a block diagram showing a configuration of the noise detection processor of the image reading apparatus in the present embodiment. With reference to the figure, noise detection processor 259 includes first lightness difference detectors 301R, 301G, 301B extracting from R, G and B signals, respectively, a region having a predetermined feature, second lightness difference detectors 302R, 302G, 302B extracting from R, G and B signals, respectively, a region having the predetermined feature, detection result extension processors 303R, 303G, 303B extending the region extracted by the second lightness detectors 302R, 302G, 302B to a vicinity thereof, NOR devices 305R, 305G, 305B, AND devices 307R, 307G, 307B, a determiner 308, and detected-area extension processors 309R, 309G, 309B.

R, G and B signals are input to noise detection processor 259, one line at a time, sequentially. Note that the R, G and B signals may be input collectively by a plurality of lines or an entire image.

The first lightness difference detector 301R receives the R signal and threshold value Ref1(R) and extracts from the R signal a region having the predetermined feature of a first level. This region is a region having a limited variation in lightness and a difference in lightness of at least threshold Ref1(R) from a region surrounding it. Such region is only required to have a size of at least one pixel. In this description a pixel included in a region having the predetermined feature of the first level will be referred to as a first feature pixel.

The region having the predetermined feature of the first level may be extracted by employing an edge extraction filter. More than one edge extraction filter are prepared for sizes of edge regions, respectively, and a value obtained as a result of filtering is compared with threshold value Ref1(R). A pixel satisfying a condition with threshold value Ref1(R) is determined as a center pixel of an edge region and from an edge extraction filter satisfying that condition the edge region's size is obtained.

FIGS. 10A-10F represent the edge extraction filter by way of example. FIG. 10A represents an edge extraction filter used to detect an edge region of a size of one pixel when an R signal is input, one line at a time. FIG. 10B represents an edge extraction filter used to detect an edge region of a size of one pixel when an R signal is input in a plurality of lines correctively.

FIG. 10C represents an edge extraction filter used to detect an edge region of a size of three pixels when an R signal is input, one line at a time. FIG. 10D represents an edge extraction filter used to detect an edge region of a size of three pixels when an R signal is input in a plurality of lines correctively.

FIG. 10E represents an edge extraction filter used to detect an edge region of a size of five pixels when an R signal is input, one line at a time. FIG. 10D represents an edge extraction filter used to detect an edge region of a size of five pixels when an R signal is input in a plurality of lines correctively.

These edge extraction filters are established under the following conditions:

(1) An edge region high in lightness is extracted when an average in lightness of pixels A and B minus that in lightness of pixel C equals at least threshold value Ref1(R):

(Average of Pixels A and B)−(Average of Pixel C)>Ref1(R).

In that case, the center pixel is one of pixels A, B and C that is the highest in lightness.

(2) An edge region low in lightness is extracted when an average in lightness of pixel C minus that in lightness of pixels A and B equals at least threshold value Ref1(R):

(Average of Pixel C)−(Average of Pixels A and B)>Ref1(R).

In that case, the center pixel is one of pixels A, B and C that is the lowest in lightness.

G and B signals can also be handled with an edge extraction filter similar to that used for the R signal.

The first lightness difference detectors 301R, 301G, 301B compare a value calculated by the above described edge extraction filter with threshold values Ref1(R), Ref1(G), Ref1 (B).

With reference again to FIG. 9, the first feature pixel extracted by the first lightness difference detector 301R is represented by a logical signal of "1" and a pixel other than the first feature pixel is represented by a logical signal of "0" and thus output to AND device 307R and determiner 308.

The second lightness difference detector 302R receives the R signal and threshold value Ref2(R) and extracts from the R signal a region having the predetermined feature of a second level. This region is a region having a limited variation in lightness and a difference in lightness of at least threshold Ref2(R) from a region surrounding it. Such region is only required to have a size of at least one pixel. In this description a pixel included in a region having the predetermined feature of the second level will be referred to as a second feature pixel. It should be noted that threshold value Ref2(R) is a smaller value than threshold value Ref1(R).

The region having the predetermined feature of the second level may be extracted by employing an edge extraction filter. More than one edge extraction filter are prepared for sizes of edge regions, respectively, and a value obtained as a result of filtering is compared with threshold value Ref2(R). A pixel satisfying a condition with threshold value Ref2(R) is determined as a center pixel of an edge region and from an edge extraction filter satisfying that condition the edge region's size is obtained.

The second lightness difference detectors 302R, 302G, 302B compare a value calculated by the above described edge extraction filter with threshold values Ref2(R), Ref2(G), Ref2 (B).

The second feature pixel extracted by the second lightness difference detector 302R is represented by a logical signal of "1" and a pixel other than the second feature pixel is represented by a logical signal of "0" and thus output to detection result extension processor 303R.

Detection result extension processor 303R sets a pixel neighboring the second feature pixel extracted by the second lightness difference detector 302R as a second feature pixel to extend a region having the predetermined feature of the second level. In other words, a pixel that exists in a vicinity of a pixel of "1" in value as represented by a logical signal received from the second lightness difference detector 302R and has a value of "0" is changed to "1". Noise can be detected with higher precision. A logical signal having contributed to extended region is output to NOR devices 305G, 305B.

The first lightness difference detector 301G receives the G signal and threshold value Ref1(G) and extracts from the G signal a region having the predetermined feature of the first level. This region is a region having a limited variation in lightness and a difference in lightness of at least threshold Ref1(G) from a region surrounding it.

The region having the predetermined feature of the first level may be extracted by employing an edge extraction filter. More than one edge extraction filter are prepared for sizes of edge regions, respectively, and a value obtained as a result of filtering is compared with threshold value Ref1(G). A pixel satisfying a condition with threshold value Ref1(G) is determined as a center pixel of an edge region and from an edge extraction filter satisfying that condition the edge region's size is obtained.

The feature pixel extracted by the first lightness difference detector 301G is represented by a logical signal of "1" and a pixel other than the first feature pixel is represented by a logical signal of "0" and thus output to AND device 307G and determiner 308.

The second lightness difference detector 302G receives the G signal and threshold value Ref2(G) and extracts from the G signal a region having the predetermined feature of the second level. This region is a region having a limited variation in lightness and a difference in lightness of at least threshold Ref2(G) from a region surrounding it. Such region is only required to have a size of at least one pixel. In this description a pixel included in a region having the predetermined feature of the second level will be referred to as a second feature pixel. It should be noted that threshold value Ref2(G) is a smaller value than threshold value Ref1(G).

The region having the predetermined feature of the second level may be extracted by employing an edge extraction filter. More than one edge extraction filter are prepared for sizes of edge regions, respectively, and a value obtained as a result of filtering is compared with threshold value Ref2(G). A pixel satisfying a condition with threshold value Ref2(G) is determined as a center pixel of an edge region and from an edge extraction filter satisfying that condition the edge region's size is obtained.

The second feature pixel extracted by the second lightness difference detector 302G is represented by a logical signal of "1" and a pixel other than the second feature pixel is represented by a logical signal of "0" and thus output to detection result extension processor 303G.

Detection result extension processor 303G sets a pixel neighboring the second feature pixel extracted by the second lightness difference detector 302G as a second feature pixel to extend a region having the predetermined feature of the second level. A logical signal having contributed to an extended region is output to NOR devices 305R, 305B.

The first lightness difference detector 301B receives the B signal and threshold value Ref1(B) and extracts from the B signal a region having the predetermined feature of the first level. This region is a region having a limited variation in lightness and a difference in lightness of at least threshold Ref1(B) from a region surrounding it.

The region having the predetermined feature of the first level may be extracted by employing an edge extraction filter. More than one edge extraction filter are prepared for sizes of edge regions, respectively, and a value obtained as a result of filtering is compared with threshold value Ref1(B). A pixel satisfying a condition with threshold value Ref1(B) is determined as a center pixel of an edge region and from an edge extraction filter satisfying that condition the edge region's size is obtained.

The feature pixel extracted by the first lightness difference detector 301B is represented by a logical signal of "1" and a pixel other than the first feature pixel is represented by a logical signal of "0" and thus output to AND device 307B and determiner 308.

The second lightness difference detector 302B receives the B signal and threshold value Ref2(B) and extracts from the B signal a region having the predetermined feature of the second level. This region is a region having a limited variation in lightness and a difference in lightness of at least threshold Ref2(B) from a region surrounding it. Such region is only required to have a size of at least one pixel. In this description a pixel included in a region having the predetermined feature of the second level will be referred to as a second feature pixel. It should be noted that threshold value Ref2(B) is a smaller value than threshold value Ref1(B).

The region having the predetermined feature of the second level may be extracted by employing an edge extraction filter. More than one edge extraction filter are prepared for sizes of edge regions, respectively, and a value obtained as a result of filtering is compared with threshold value Ref2(B). A pixel satisfying a condition with threshold value Ref2(B) is determined as a center pixel of an edge region and from an edge extraction filter satisfying that condition the edge region's size is obtained.

The second feature pixel extracted by the second lightness difference detector 302B is represented by a logical signal of "1" and a pixel other than the second feature pixel is represented by a logical signal of "0" and thus output to detection result extension processor 303B.

Detection result extension processor 303B sets a pixel neighboring the second feature pixel extracted by the second lightness difference detector 302B as a second feature pixel to extend a region having the predetermined feature of the second level. A logical signal having contributed to an extended region is output to NOR devices 305R, 305G.

NOR device 305R receives from each of detection result extension processor 303G, 303B a logical signal having contributed to an extended region. NOR device 305R outputs to AND device 307R a logical signal corresponding to an inversion of an OR of two received logical signals. More specifically, a pixel which is not a second feature pixel for either a G or B signal is represented by a logical signal of "1" for output and a pixel which is a second feature pixel for at least one of the signals is represented by a logical signal of "0" for output.

AND device 307R outputs to determiner 308 an AND of a logical signal received from the first lightness difference detector 301R and that received from NOR device 305R. More specifically, a pixel which is a first feature pixel for an R signal and not an extended second feature pixel for either a B or G signal is represented by a logical signal of "1" and a pixel different therefrom is represented by a logical signal of "0" for output. A pixel of "1" in value as represented by this logical signal indicates a noise pixel. Thus by NOR device 305R and AND device 307R a first feature pixel extracted from an R signal that has not been extracted as a second feature pixel for either a G or B signal is determined as a noise pixel.

NOR device 305G receives from each of detection result extension processors 303R, 303B a logical signal having contributed to an extended region. NOR device 305G outputs to AND device 307G a logical signal corresponding to an inversion of an OR of two received logical signals. More specifically, a pixel which is not a second feature pixel for either an R or B signal is represented by a logical signal of "1" for output and a pixel which is a second feature pixel for at least one of the signals is represented by a logical signal of "0" for output.

AND device 307G outputs to determiner 308 an AND of a logical signal received from the first lightness difference detector 301G and that received from NOR device 305G. More specifically, a pixel which is a first feature pixel for a G signal and not an extended second feature pixel for either a R or B signal is represented by a logical signal of "1" and a pixel different therefrom is represented by a logical signal of "0" for output. A pixel of "1" in value as represented by this logical signal indicates a noise pixel. Thus by NOR device 305G and AND device 307G a first feature pixel extracted from a G signal that has not been extracted as a second feature pixel for either an R or B signal is determined as a noise pixel.

NOR device 305B receives from each of detection result extension processors 303R, 303G a logical signal having contributed to an extended region. NOR device 305B outputs to AND device 307B a logical signal corresponding to an inversion of an OR of two received logical signals. More specifically, a pixel which is not a second feature pixel for either an R or G signal is represented by a logical signal of "1" for output and a pixel which is a second feature pixel for at least one of the signals is represented by a logical signal of "0" for output.

AND device 307B outputs to determiner 308 an AND of a logical signal received from the first lightness difference detector 301B and that received from NOR device 305B. More specifically, a pixel which is a first feature pixel for a B signal and not an extended second feature pixel for either an R or G signal is represented by a logical signal of "1" and a pixel different therefrom is represented by a logical signal of "0" for output. A pixel of "1" in value as represented by this logical signal indicates a noise pixel. Thus by NOR device 305B and AND device 307B a first feature pixel extracted from a B signal that has not been extracted as a second feature pixel for either an R or G signal is determined as a noise pixel.

Determiner 308 receives from the first lightness difference detectors 301R, 301G, 301B the logical signal of "1" representing the first feature pixel, from AND devices 307R, 307G, 307B the logical signal of "1" representing the noise pixel of R, G and B signals each, and from controller 263 the direction in which platen 205 is moved. Determiner 308 determines whether or not the pixel determined as a noise pixel is valid. A detailed description of determiner 308 is given hereinlater.

If detected-area extension processor 309R receives a logical signal of "1" from AND device 307R for a pixel, detected-area extension processor 309R sets a pixel that exists in a vicinity of the pixel corresponding to the "1" to a "1" to extend a noise pixel's range. This is done to provide improved precision with which a noise pixel is corrected. The noise pixel extended in range is represented by a logical signal of "1" which is in turn output to noise corrector 260.

If detected-area extension processor 309G receives a logical signal of "1" from AND device 307G for a pixel, detected-area extension processor 309G sets a pixel that exists in a vicinity of the pixel corresponding to the "1" to a "1" to extend a noise pixel's range. This is done to provide improved precision with which a noise pixel is corrected. The noise pixel extended in range is represented by a logical signal of "1" which is in turn output to noise corrector 260.

If detected-area extension processor 309B receives a logical signal of "1" from AND device 307B for a pixel, detected-area extension processor 309B sets a pixel that exists in a vicinity of the pixel corresponding to the "1" to a "1" to extend a noise pixel's range. This is done to provide improved precision with which a noise pixel is corrected. The noise pixel extended in range is represented by a logical signal of "1" which is in turn output to noise corrector 260.

Figure 11:
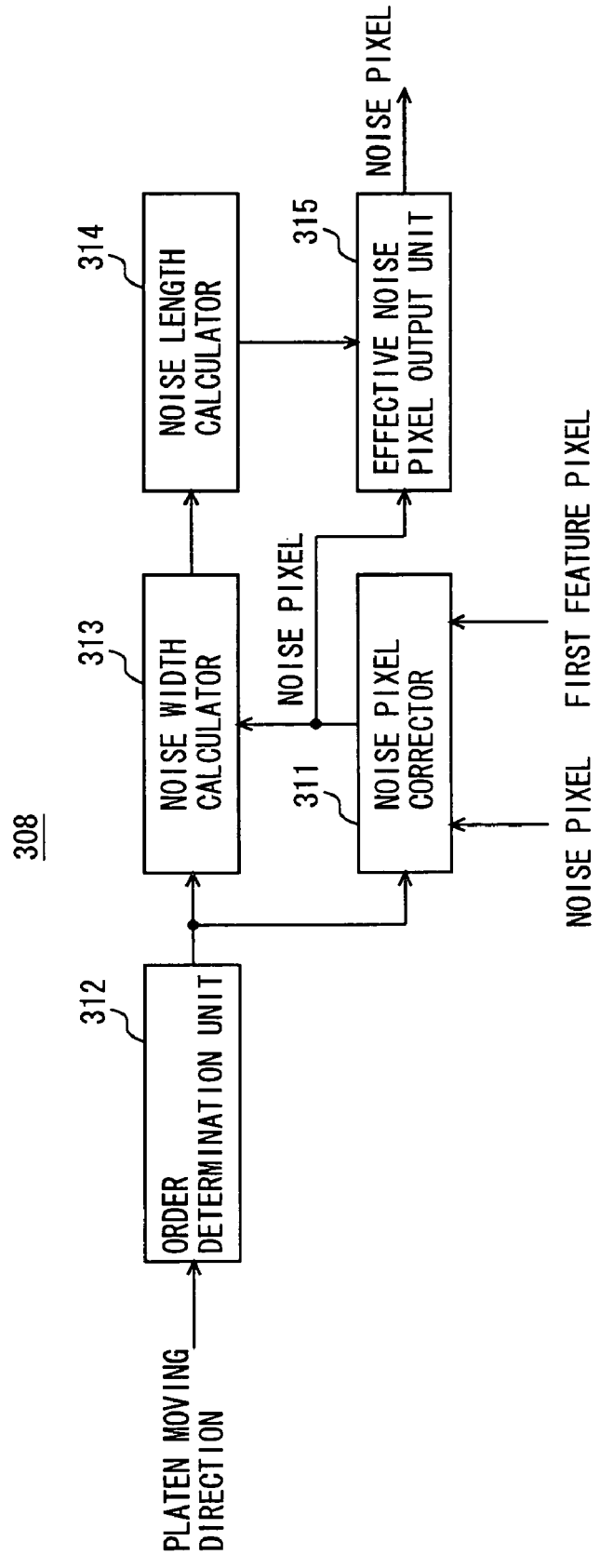
FIG. 11 is a functional block diagram showing in detail a configuration of a determiner.

FIG. 11 is a functional block diagram showing in detail a configuration of the determiner. With reference to FIG. 11, determiner 308 includes a noise pixel corrector 311, an order determination unit 312, a noise width calculator 313, a noise length calculator 314, and an effective noise pixel output unit 315.

To order determination unit 312, the direction in which platen 205 is moved is input. Based on the direction in which platen 205 is moved, order determination unit 312 determines the order in which noise pixels are expected to be detected from the R, G and B signals, i.e., determines from which signals noise pixels are expected to be firstly, secondly and thirdly detected respectively. A signal from which the noise pixel is expected to be detected firstly is herein referred to as first signal, a signal from which the noise pixel is expected to be detected secondly is herein referred to as second signal, and a signal from which the noise pixel is expected to be detected thirdly is herein referred to as third or last signal. The determined order is output to noise width calculator 313. This order is determined in the following manner on the basis of the three conditions.

(1) In the case where platen 205 is moved in the same direction as that in which the original is transported and at a lower rate than the rate at which the original is transported, the first signal is the R signal output from line sensor 213R, the second signal is the G signal output from line sensor 213G and the third signal is the B signal output from line sensor 213B.

(2) In the case where platen 205 is moved in the same direction as that in which the original is transported and at a higher rate than the rate at which the original is transported, the first signal is the B signal output from line sensor 213B, the second signal is the G signal output from line sensor 213G and the third signal is the R signal output from line sensor 213R.

(3) In the case where platen 205 is moved in the opposite direction to the direction in which the original is transported, the first signal is the B signal output from line sensor 213B, the second signal is the G signal output from line sensor 213G and the third signal is the R signal output from line sensor 213R. In this case the relation between the magnitude of the rate at which platen 205 is moved and the magnitude of the rate at which the original is transported is irrelevant to the order in which noise pixels are detected from the signals.

When dust adhering on platen 205 is large in the sub scanning direction and thus read simultaneously by at least two of line sensors 213R, 213G, 213B, noise pixel corrector 311 corrects a first feature pixel that has not been determined as a noise pixel to the noise pixel. Noise pixel corrector 311 receives from the first lightness difference detectors 301R, 301G, 301B the logical signal of "1" representing the first feature pixel, from AND devices 307R, 307G, 307B the logical signal of "1" representing the noise pixel of R, G and B signals each, and the order of the R, G and B signals determined by order determination unit 312. Based on these signals, noise pixel corrector 311 determines which pixels of first feature pixels that have not been determined as noise pixels should be corrected to noise pixels. Details are given hereinlater.

Noise width calculator 313 counts the number of noise pixels successive in the main scanning direction that are detected from a signal among the R, G and B signals that precedes in the determined order, and outputs the count of the noise pixels as a noise width to noise length calculator 314.

Based on the number of the noise pixels successive in the main scanning direction that is output from noise width calculator 313, the rate at which the original is transported, the rate at which platen 205 is moved, and the distance between line sensors 213R, 213G, 213B, noise length calculator 314 predicts, as a noise length, the number of noise pixels that should be present in the sub scanning direction (this number of noise pixels is also referred to as "number of lines" hereinlater). Lines included in the predicted noise length starting from the line based on which the noise length is calculated are effective lines. The effective lines are output to effective noise pixel output unit 315.

In the lines of the noise length, noise pixels may not successively be located in the sub scanning direction. The noise length refers to the number of lines including as the last line in which a noise pixel detected from any of the R, G and B signals should be present. Here, the lines included in the noise length are referred to as effective lines. Noise length calculator 314 calculates the noise length on the precondition that the dust adhering on platen 205 is circular or close to circular. The size of dust in the main scanning direction can be determined from the number of successive noise pixels detected from the R, G and B signals. The size of the dust in the sub scanning direction varies depending on the rate at which the original is transported, the rate at which platen 205 is moved and the distance between line sensors 213R, 213G, 213B. Then, noise length calculator 314 calculates the noise length using the following expression (1) based on the size of the dust in the main scanning direction, the rate at which the original is transported, the rate at which platen 205 is moved, and the distance between line sensors 213R, 213G, 213B:

noise length=(noise width in the main scanning direction+distance between line sensors×2)×original transport rate/platen moving rate (1).

The noise width in the main scanning direction, namely the size of dust in the main scanning direction, refers to the number of noise pixels successive in the main scanning direction that are detected from the first signal. The noise length is represented by the number of lines (the number of noise pixels successive in the sub scanning direction). The noise length is the number of lines including as the last line where noise pixels are expected to be present in the sub scanning direction.

Expression (1) is used to calculate, when noise pixels are detected from the first signal among the R, G and B signals, the number of lines ending with a line where any noise pixel detected from the last signal is expected to be present.

There could be the case where no noise pixel is detected from the first signal. For example, if a cyan region of an original is being read while dust of an achromatic color, black for example, is present in region 205R corresponding to line sensor 213R, the resultant R, G and B signals are those as shown in FIG. 8B. From the R signal which is the first signal, no noise pixel is detected. In this case, any noise pixels should be detected from the G signal which is the second signal. Then, the noise length is calculated from the number of noise pixels successive in the main scanning direction that are detected from the G signal, using the following expression (2):

noise length=(noise width in the main scanning direction+distance between line sensors)×original transport rate/platen moving rate (2).

Effective noise pixel output unit 315 receives effective lines from noise length calculator 314 as well as noise pixels corrected by noise pixel corrector 311. Of the noise pixels, noise pixels within the effective lines are effective noise pixels, and effective noise pixel output unit 315 outputs a logical signal of "1" representing the effective noise pixels to detected-area extension processors 309R, 309G, 309B.

Figure 12:
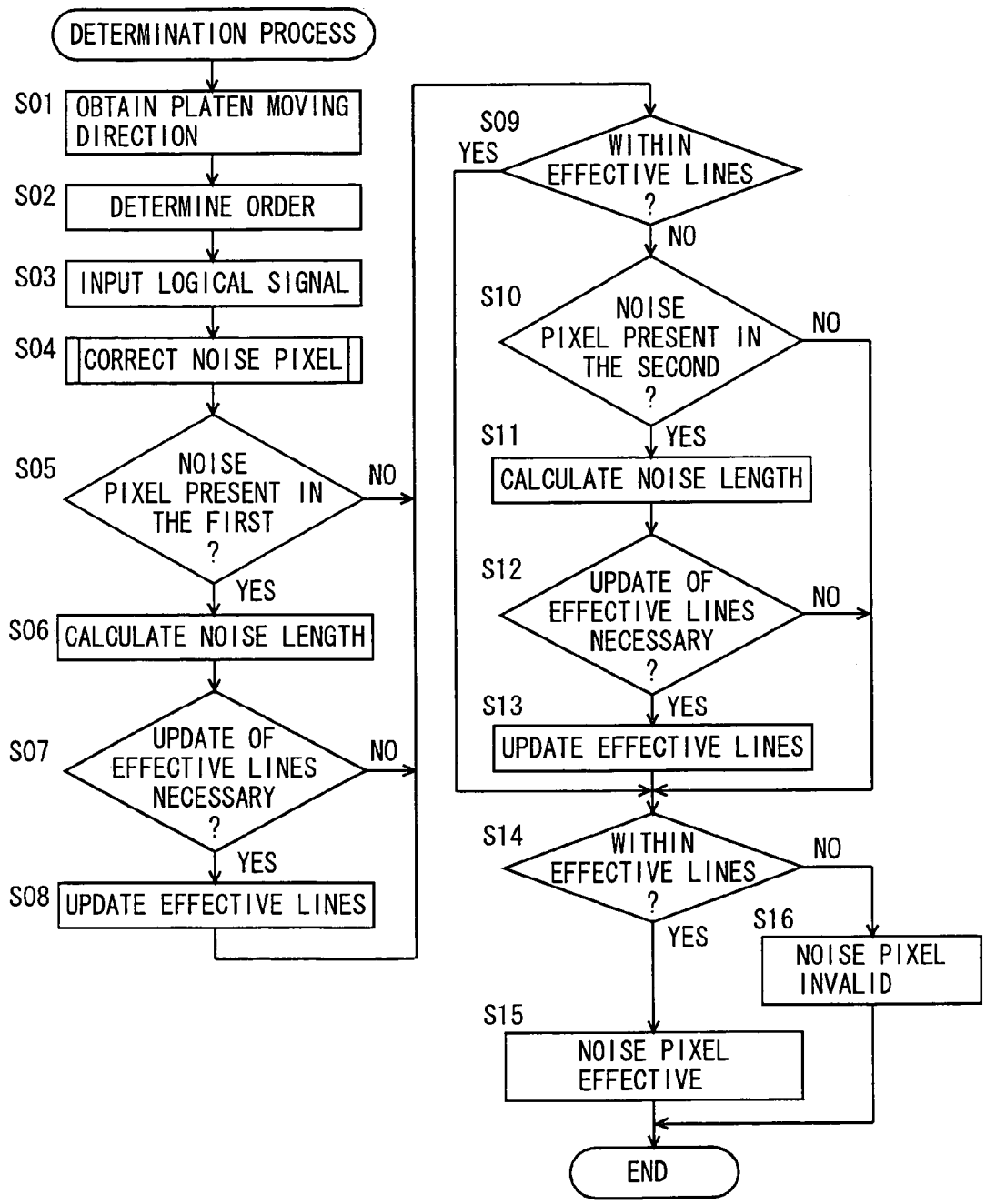
FIG. 12 is a flowchart showing a flow of a process followed by the determiner of the noise detection processor.

FIG. 12 is a flowchart showing a flow of a determination process followed by the determiner of the noise detection processor. The determination is made each time logical signals corresponding to the R, G and B signals are input. Logical signals corresponding to respective R, G and B signals are input in the order in which line sensors 213R, 213G, 213B output respective R, G and B signals. With reference to FIG. 12, in the determination process followed by determiner 308, the direction in which platen 205 is moved is first provided (step S01). Then, the order in which noise pixels are detected from the R, G and B signals is determined (step S02).

In step S03, logical signals corresponding to respective R, G and B signals are input. Then, noise pixel correction for three logical signals is made (step S04). The noise pixel correction is made to correct a first feature pixel that has not been determined as a noise pixel to a noise pixel if noise pixels continue in the sub scanning direction. In step S05 and thereafter, the noise pixels resultant from the noise pixel correction are processed.

In step S05, it is determined whether or not noise pixels are present in the first signal among the R, G and B signals. If present, the process proceeds to step S06. If not, the process proceeds to step S09. In step S06, the number of successive noise pixels detected from this first signal is counted to determine the noise length using the above-described expression (1).

In the subsequent step S07, it is determined whether or not effective lines have to be updated. If effective lines have to be updated, the effective lines are updated in step S08. If not, step S08 is skipped and thus the effective lines are not updated. In steps S07 and S08, if effective lines determined by the line length calculated from the latest line (logical signal input in step S03) extend further than effective lines determined by the line length calculated from the preceding line (logical signal that is previously input), the effective lines are updated to the effective lines determined from the latest line. For example, if the dust is circular, the maximum number of successive noise pixels (maximum size of the dust) is equal to the diameter of the dust. Then, the effective lines are updated until a signal from which the maximum size of the dust is read is detected so as to improve the accuracy of the effective lines.

In step S09, it is determined whether or not the logical signals input in step S03 are for any line included in the effective lines. If so, the process proceeds to step S14. If not, the process proceeds to step S10. This determination as to whether or not the logical signals are for any line included in effective lines may be made for example by counting the number of input logical signals and determining whether or not the number of lines of the input logical signals is within the effective lines.

The process proceeds to step S10 when the lines input in step S03 are not within the effective lines. Then, considering the case where no noise pixel is detected from the aforementioned first signal, it is determined whether or not noise pixels are present in the second signal among the R, G and B signals. If present, the process proceeds to step S11. If not, the process proceeds to step S14. In step S11, the number of successive noise pixels detected from the second signal is counted to determine the noise length using the above-described expression (2).

In the subsequent step S12, it is determined whether or not effective lines have to be updated. If effective lines have to be updated, the effective lines are updated in step S13 and the process thereafter proceeds to step S14. If not in step S12, the process skips step S13 and proceeds to step S14. In this case, the effective lines are not updated. In steps S12 and S13, similarly to steps S07 and S08, the effective lines are updated until a signal of a line from which the maximum dust size is read is detected to improve the accuracy of the effective lines.

In step S14, it is determined whether or not the logical signals input in step S03 are for any line included in the effective lines. The effective lines here are the effective lines updated in step S08 or the effective lines updated in step S13. If included in step S14, the step proceeds to step S15. If not, the process proceeds to step S16.

In step S15, noise pixels are determined as effective. In step S16, noise pixels are determined as invalid. Specifically, value "1" representing a noise pixel of a logical signal is replaced with value "0".

Figure 13:
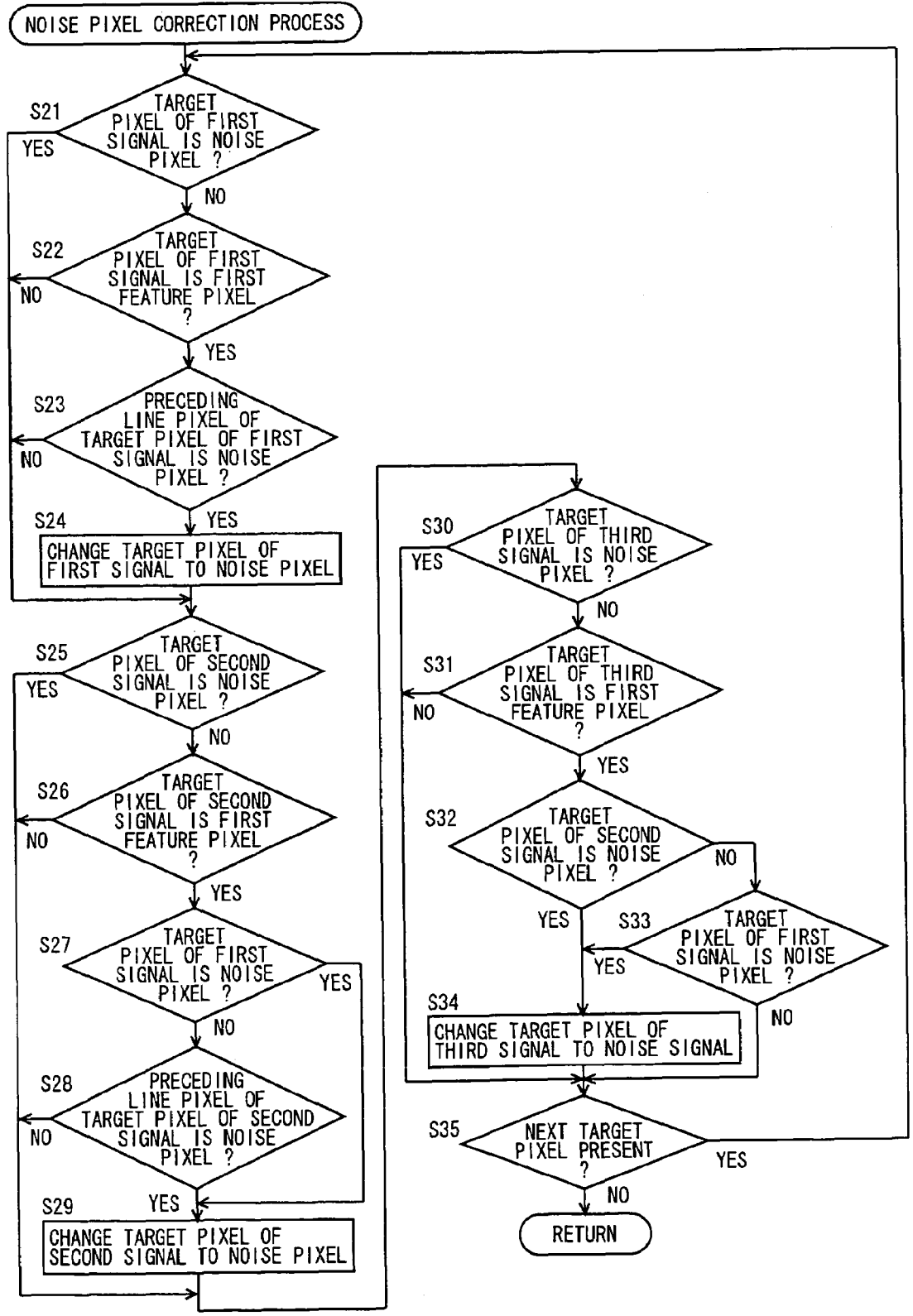
FIG. 13 is a flowchart showing a flow of a noise pixel correction process in step S04 of FIG. 12.

FIG. 13 is a flowchart showing a flow of the noise pixel correction in step S04 of FIG. 12. With reference to FIG. 13, in the process of the noise pixel correction, a target pixel is selected from the first one of R, G and B signals to determine whether or not the target pixel is a noise pixel (step S21). Here, the target pixel is a pixel to be subjected to the noise pixel correction. Noise detection processor 259 receives a logical signal corresponding to the R signal and representing a noise pixel as "1", a logical signal corresponding to the G signal and representing a noise pixel as "1" and a logical signal corresponding to the B signal and representing a noise pixel as "1". Accordingly, in this noise pixel correction process, if a target pixel of a logical signal corresponding to the first signal is "1", the target pixel is determined as a noise pixel. Thus, if the target pixel is a noise pixel, the process proceeds to step S25. If not, the process proceeds to step S22.

In step S22, it is determined whether or not the target pixel of the first signal is a first feature pixel. If so, the process proceeds to step S23. If not, the process proceeds to step S25. When the process proceeds to step S23, the target pixel of the first signal is not a noise pixel but the first feature pixel. In this case, a target pixel of the second signal is a first feature pixel, a target pixel of the third signal is a first feature pixel, or respective target pixels of the second and third signals are first feature pixels. In such a case, the target pixel of the first signal could be a pixel that reads dust adhering on platen 205. In the following steps, it is determined whether or not the target pixel of the first signal is a pixel that reads dust adhering on platen 205. Here, in such a case where a target pixel of the first signal and a target pixel of the third signal are first feature pixels and a target pixel of the second signal is not a first feature pixel, it is possible for example that white dust adheres on platen 205 while a green region of an original is being read.

In step S23, it is determined whether or not the pixel of the preceding line that is at the same position in the main scanning direction as the target pixel of the first signal has been determined as a noise pixel. If so, the process proceeds to step S24. If not, the process proceeds to step S25. This determination is made on the basis of a logical signal that is previously input to noise detection processor 259 and representing the noise pixel of the line having been subjected to the noise pixel correction as "1".

In step S24, the target pixel of the first signal is changed to a noise pixel. Specifically, value "0" of the target pixel of the logical signal corresponding to the first signal and representing a noise pixel as "1" is changed to "1". Namely, when the target pixel of the first signal is the first feature pixel and the pixel of the preceding line that is at the same position in the main scanning direction as the target pixel of the first signal is a noise pixel, the target pixel of the first signal is changed to the noise pixel.

The target pixel of the first signal is changed to the noise pixel in step S24 on the condition that:

the target pixel of the first signal is the first feature pixel, at least one of the target pixel of the second signal and the target pixel of the third signal is the first feature pixel and the target pixel of the preceding line that is at the same position in the main scanning direction as the target pixel of the first signal is a noise pixel.

In the following step S25, it is determined whether or not the target pixel of the second signal is a noise pixel. If so, the process proceeds to step S30. If not, the process proceeds to step S26.

In step S26, it is determined whether or not the target pixel of the second signal is a first feature pixel. If so, the process proceeds to step S27. If not, the process proceeds to step S30. When the process proceeds to step S27, the target pixel of the second signal is not a noise pixel but the first feature pixel. In this case, the target pixel of the first signal is a first feature pixel, the target pixel of the third signal is a first feature pixel, or respective target pixels of the first and third signals are first feature pixels. In such a case, the target pixel of the second signal could be a pixel that reads dust adhering on platen 205. In the following steps, it is determined whether or not the target pixel of the second signal is a pixel that reads dust adhering on platen 205.

In step S27, it is determined whether or not the target pixel of the first signal is a noise pixel. If so, the process proceeds to step S29. If not, the process proceeds to step S28. When the target pixel of the first signal is a noise pixel, the target pixel of the second signal is changed to a noise pixel.

In step S28, it is determined whether or not the pixel of the preceding line that is at the same position in the main scanning direction as the target pixel of the second signal has been determined as a noise pixel. If so, the process proceeds to step S29. If not, the process proceeds to step S30. This determination is made on the basis of a logical signal that is previously input to noise detection processor 259 and representing the noise pixel of the line having been subjected to the noise pixel correction as "1".

In step S29, the target pixel of the second signal is changed to a noise pixel. Specifically, value "0" of the target pixel of the logical signal corresponding to the second signal and representing a noise pixel as "1" is changed to "1". In step S29, the target pixel of the second signal is changed to the noise pixel on the following condition:

(1) the target pixel of the second signal is the first feature pixel and the target pixel of the first signal is the noise pixel, this condition including the condition that respective target pixels of the second and first signals are first feature pixels and the pixel of the preceding line that is at the same position in the main scanning direction as the target pixel of the first signal is a noise pixel; or (2) respective target pixels of the second and third signals are first feature pixels and the pixel of the preceding line that is at the same position in the main scanning direction as the target pixel of the second signal is a noise pixel.

In the subsequent step S30, it is determined whether or not the target pixel of the third signal is a noise pixel. If so, the process proceeds to step S35. If not, the process proceeds to step S31.

In step S31, it is determined whether or not the target pixel of the third signal is a first feature pixel. If so, the process proceeds to step S32. If not, the process proceeds to step S35. When the process proceeds to step S32, the target pixel of the third signal is not a noise pixel but the first feature pixel. In this case, the target pixel of the first signal is the first feature pixel, the target pixel of the second signal is the first feature pixel, or respective target pixels of the first and second signals are the first feature pixels, and it is possible that the target pixel of the third signal is a pixel that reads dust adhering on platen 205. In the following steps, it is determined whether or not the target pixel of the third signal is a pixel that reads dust adhering on platen 205.

In step S32, it is determined whether or not the target pixel of the second signal is a noise pixel. If so, the process proceeds to step S34. If not, the process proceeds to step S33. When the target pixel of the second signal is a noise pixel, the target pixel of the third signal is determined as a noise pixel.

In step S33, it is determined whether or not the target pixel of the first signal is a noise pixel. If so, the process proceeds to step S34. If not, the process proceeds to step S35. Namely, when the target pixel of the first signal is a noise pixel, the target pixel of the third signal is determined as a noise pixel. If the first feature pixel is not detected from the second signal, the first feature pixel detected from the third signal is determined as a noise pixel, in such a case where white dust adheres on platen 205 while a green region of an original is being read.

In step S34, the target pixel of the third signal is changed to a noise pixel. Specifically, value "0" of the target pixel of the logical signal corresponding to the third signal and representing a noise pixel as "1" is changed to "1". In step S34, the target pixel of the third signal is changed to the noise pixel on the following condition:

(1) the target pixel of the third signal is the first feature pixel and the target pixel of the second signal is the noise pixel, this condition including the condition that respective target pixels of the third and second signals are first feature pixels and the pixel of the preceding line that is at the same position in the main scanning direction as the target pixel of the second signal is a noise pixel; or (2) the target pixel of the third signal is the first feature pixel and the target pixel of the first signal is the noise pixel, this condition including the condition that respective target pixels of the third and first signals are first feature pixels and the pixel of the preceding line that is at the same position in the main scanning direction as the target pixel of the first signal is a noise pixel.

In the subsequent step S35, it is determined whether or not a subsequent target pixel is present. If so, the process returns to step S21. If not, the process is ended. In this way, the noise pixel correction is made for all pixels of logical signals input to noise detection processor 259.

With noise pixel corrector 311, first feature pixels extracted from at least two of the R, G and B signals are corrected to noise pixels on the condition that, for one of the R, G and B signals, the pixel of the preceding line that is at the same position in the main scanning direction as the first feature pixel is a noise pixel. In this way, even if large dust adheres on platen 205 that results in first feature pixels extracted from at least two of the R, G and B signals, noise can be detected from the R, G and B signals.

As discussed above, image reading apparatus 10 in the present embodiment predicts the length of noise in the sub scanning direction from the number of noise pixels successive in the main scanning direction, so that data where noise pixels are expected to be present can be predicted. Then, the noise pixels detected from this predicted data are as effective, so that the detection accuracy of noise pixels can be improved.

<Modification of the Determiner>

Figure 14:
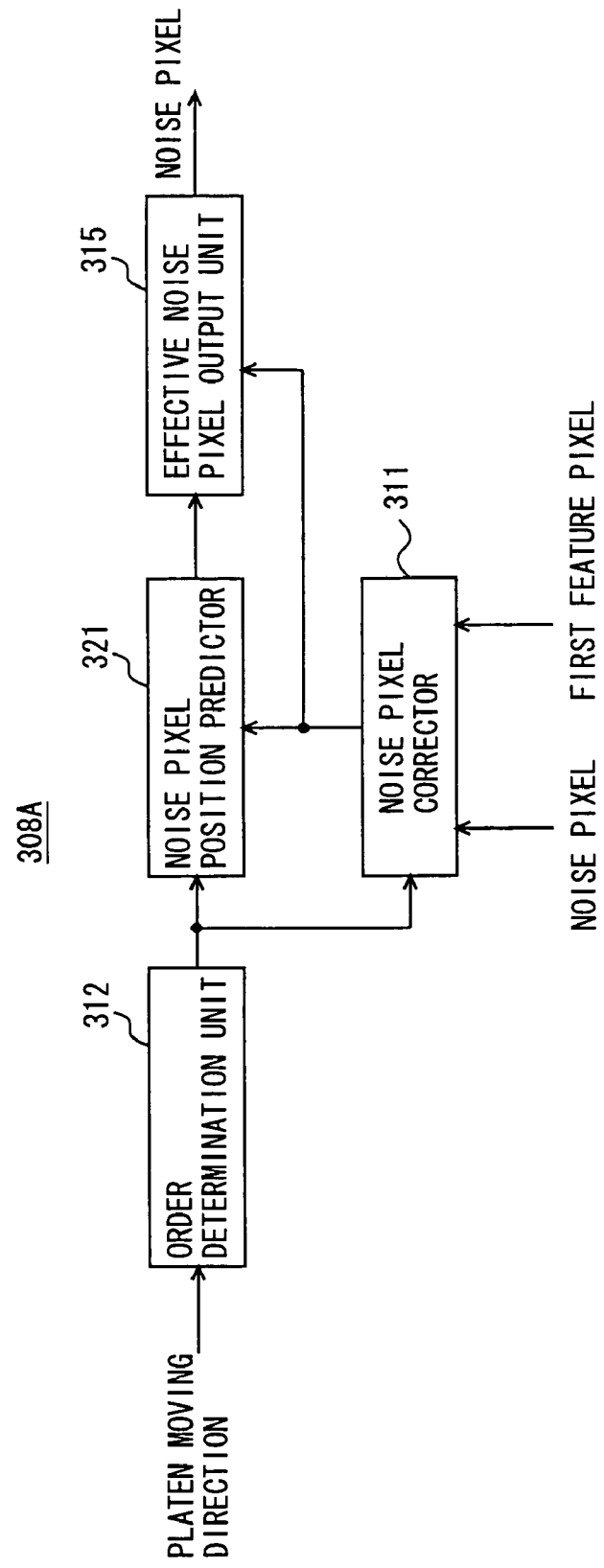
FIG. 14 is a functional block diagram showing in detail a configuration of a modification of the determiner.

FIG. 14 is a functional block diagram showing in detail a configuration of a modification of the determiner. With reference to FIG. 14, determiner 308A differs from above-described determiner 308 in that the former includes a noise pixel position predictor 321 instead of noise width calculator 313 and noise length calculator 314. Other components and configuration thereof are the same as those of determiner 308 and the description thereof is not repeated here.

Noise pixel position predictor 321 receives from order determination unit 312 the order in which noise pixels are detected from the R, G and B signal and from noise pixel corrector 311 logical signals representing a noise pixel as "1". Noise pixel position predictor 321 predicts the position of a noise pixel detected from the third signal, from the position of a noise pixel detected from a signal preceding in the determined order, determines effective lines that are lines from the line of the detected noise pixel to the line of the noise pixel at the predicted position, and outputs the determined effective lines to effective noise pixel output unit 315.

Noise pixel position predictor 321 calculates the position of the noise pixel of the third signal based on the position of the noise pixel detected from the first or second signal, the rate at which the original is transported, the rate at which platen 205 is moved, and the distance between line sensors 213R, 213G, 213B, using the following expression (3) or (4). The position of the noise pixel of the third signal is represented as a position relative to the position of the noise pixel detected from the first or second signal, by the number of lines from the position of the noise pixel detected from the first or second signal (the number of pixels successive in the sub scanning direction).

The noise pixel position is calculated from the position of the noise pixel detected from the first signal by expression:

the number of lines=(distance between line sensors× 2)×original transport rate/platen moving rate (3).

The noise pixel position is calculated from the position of the noise pixel detected from the second signal by expression:

the number of lines=(distance between line sensors)× original transport rate/platen moving rate (4).

From expression (3), the number of lines is determined when the noise pixel is detected from the first signal among the R, G and B signals, the lines here start from the line where the noise pixel detected from the first signal is located to the line where the noise pixel is expected to be detected from the third signal.

There is a case where no noise pixel is detected from the first signal. This is for example the case where a cyan region of an original is being read while dust of achromatic color, black, for example is present in region 205R corresponding to line sensor 213R. In this case, when the noise pixel is detected from the second signal, i.e., G signal, the number of lines from the line where the noise pixel is detected from the second signal to the line where the noise signal is expected to be detected from the third signal is determined using expression (4).

Figure 15:
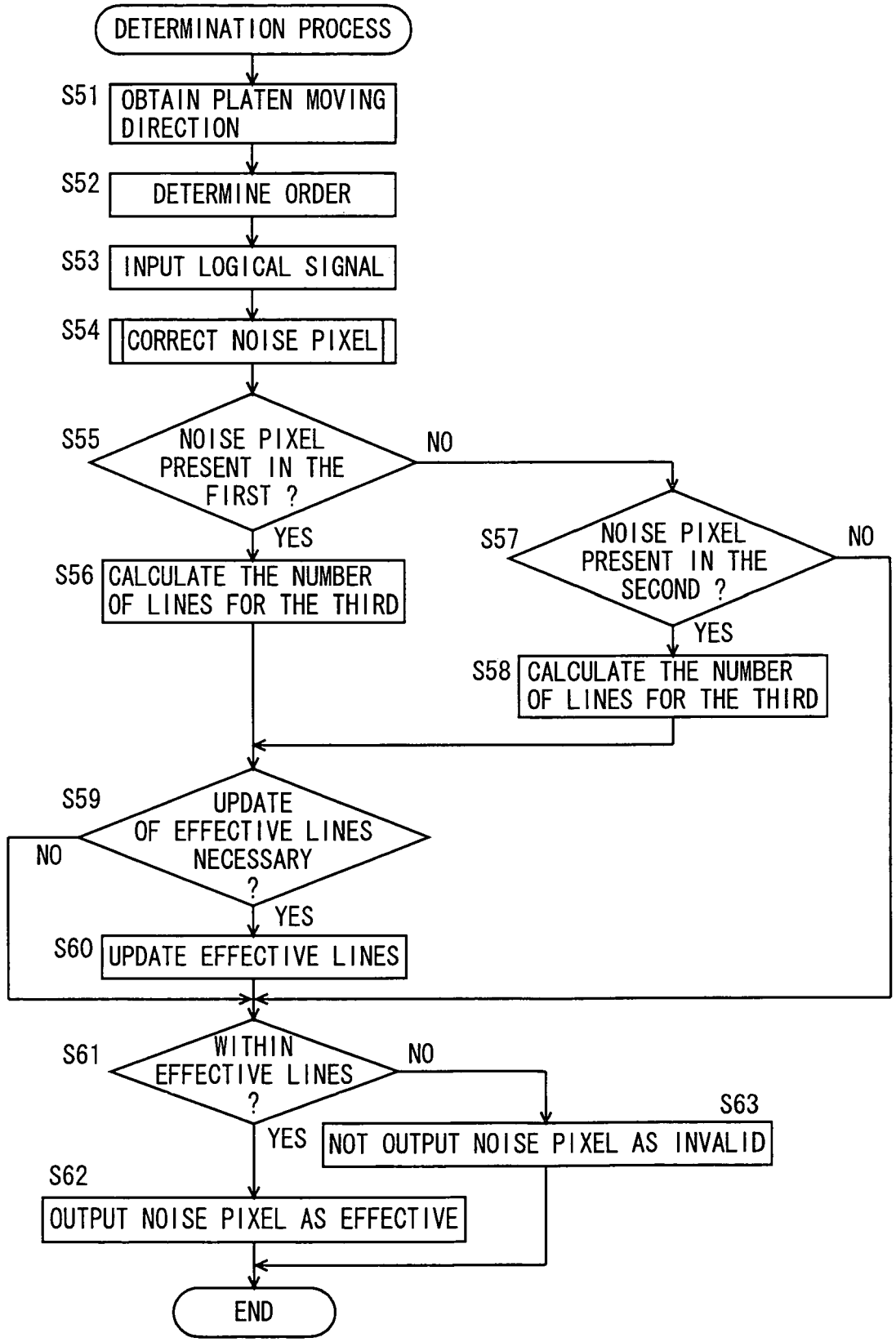
FIG. 15 is a flowchart showing a flow of a process followed by the determiner of the modification.

FIG. 15 is a flowchart showing a flow of a process followed by the determiner of the modification. The determination in this modification is made each time logical signals corresponding to the R, G and B signals and representing a noise pixel as "1" are input. With reference to FIG. 15, the operations in steps S51 to S54 are identical to those in steps S01 to S04 of the determination process shown in FIG. 12, and the description thereof is not repeated here.

In step S55, it is determined whether or not a noise pixel is present in the first signal among the R, G and B signals. If so, the process proceeds to step S56. If not, the process proceeds to step S57. In step S56, using expression (3) described above, the number of lines including as the last line the line of the noise pixel of the third signal is calculated. Then, the lines including as the last line the line of the noise pixel of the third signal are determined as effective lines.

In step S57, it is determined whether or not a noise pixel is present in the second signal among the R, G and B signals. If so, the process proceeds to step S58. If not, the process proceeds to step S61. In step S58, using expression (4) described above, the number of lines including as the last line the line of the noise pixel of the third signal is calculated. Then, the lines including as the last line the line of the noise pixel of the third signal are determined as effective lines.

In the subsequent step S59, it is determined whether or not update of the effective lines is necessary. If necessary, the effective lines are updated in step S60. If not, step S60 is skipped and thus the effective lines are not updated. In steps S59 and S60, if effective lines determined from the latest line extend further than effective lines determined from the preceding line, the effective lines are updated to the effective lines determined from the latest line.

In step S61, it is determined whether or not a logical signal representing a noise pixel as "1" that is input in step S53 is for any line within the effective lines. If so, the process proceeds to step S62. If not, the process proceeds to step S63.

In step S62, the noise pixel is determined as effective. In step S63, the noise pixel is determined as invalid. Specifically, the value "1" of the logical signal representing the noise pixel is replaced with "0".

As heretofore discussed, for noise detection processor 259 of image reading apparatus 10, noise pixels are detected from three pieces of data output from line sensors 213R, 213G, 213B, and the order in which noise is detected from the data output from the line sensors is determined based on the order in which the line sensors are arranged and the direction in which the platen is moved. Then, in response to detection of a noise pixel from data output from a preceding line sensor, the position of a noise pixel to be detected from the last line sensor is predicted based on the position of the noise pixel from the preceding line sensor, the rate at which the original is transported, the rate at which platen 205 is moved, and the distance between line sensors 213R, 213G and 213B. In the period from the time at which the noise pixel is detected from data output from the preceding line sensor to the time at which data of the expected position is output from the last line sensor, a noise pixel detected from a line sensor later in order is determined as effective, rather than a line sensor preceding in order. Accordingly, the precision of detection of noise, which is generated due to dust present on the platen, from an image read from an original can be improved.

Further, image reading apparatus 10 in the present embodiment uses expression (1) or (2) to predict the noise length. In expression (1) or (2), the noise width in the main scanning direction refers to the size of dust in the main scanning direction and the noise length refers to the number of lines including the last line where noise pixels are expected to be present in the sub scanning direction. The prediction is made on the assumption that the dust is circular. Therefore, all the pixels of the expected noise length may be processed as noise pixels.

Note that while the present embodiment has been described with reader 213 fixed to main body 103 by way of example, alternatively, the present invention is also applicable to moving reader 213 for scanning. For example, the upper restraint plate is of monochromatic color of white or black, and reader 213 or the source of light 206, reflector mirror 209 and reflector member 208 are moved in the sub scanning direction for scanning. During the scan, platen 205 can be oscillated in the sub scanning direction to detect dust adhering on platen 205.

Although the present invention has been described and illustrated in detail, it is clearly understood that the same is by way of illustration and example only and is not to be taken by way of limitation, the spirit and scope of the present invention being limited only by the terms of the appended claims.

What is claimed is:
1. An image reading apparatus comprising:
   a plurality of line sensors arranged to be mutually spaced in a sub scanning direction to scan an original in the sub scanning direction;
   a platen arranged between the original and said plurality of line sensors;
   a mover moving said platen at a rate relative to said plurality of line sensors, said rate being different from that of the original relative to said plurality of line sensors;
   a noise pixel detector detecting a noise pixel from each of a plurality of data output from said plurality of line sensors;
   a determination unit determining the order in which the noise pixel is detected from the data output from said plurality of line sensors, based on the order in which said plurality of line sensors are arranged and the direction in which said platen is moved;
   a noise length predictor predicting the length of noise in the sub scanning direction, in response to detection of the noise pixel by said noise pixel detector from the data output from one of said plurality of line sensors that precedes in the order determined by said determination unit, said length being predicted based on the number of detected noise pixels successive in a main scanning direction, the rate of said original relative to said plurality of line sensors, the rate of said platen relative to said plurality of line sensors, and the distance between said plurality of arranged line sensors; and
   a determiner determining as effective the noise pixel detected from the data output from one of said line sensors that follows said line sensor preceding in the order determined by said determination unit, in the period from the time at which the noise pixel is detected from the data output from said line sensor preceding in the order to the time at which said predicted length of noise is reached.

2. The image reading apparatus according to claim 1, wherein
   said noise pixel detector includes an extractor extracting from each of said plurality of data output from said plurality of line sensors a feature pixel having a predetermined feature, and
   said noise pixel detector compares pixels of said plurality of data corresponding to a single location on the original to detect said feature pixel extracted from one of said plurality of data, as a noise pixel if said feature pixel is not a feature pixel for said plurality of data other than said one of said plurality of data.

3. The image reading apparatus according to claim 2, wherein
   said noise pixel detector includes a noise pixel corrector correcting feature pixels extracted from at least two data to noise pixels on the condition that a pixel of a line preceding a feature pixel of preceding data is a noise pixel.

4. The image reading apparatus according to claim 2, wherein said extractor includes an edge extractor extracting an edge region and extracts as said feature pixel a pixel included in the extracted edge region.

5. The image reading apparatus according to claim 2, wherein
said extractor includes a region extractor extracting a region having a limited variation in lightness and a difference from a neighboring region in lightness of at least a predetermined value, and extracts as said feature pixel a pixel included in said extracted region.

6. The image reading apparatus according to claim 2, wherein
said noise pixel detector includes an extender setting as a feature pixel a pixel neighboring said feature pixel, and detects said feature pixel extracted from one of said plurality of data, as a noise pixel if said feature pixel is not a feature pixel extended by said extender for said plurality of data other than said one of said plurality of data.

7. The image reading apparatus according to claim 1, wherein
said plurality of line sensors each include a filter different in spectral sensitivity to receive light reflected from the original through the filter.

8. The image reading apparatus according to claim 1, further comprising an original transporter transporting the original while said plurality of line sensors scan the original.

* * * * *